(12) United States Patent
Yoneda

(10) Patent No.: US 7,948,927 B2
(45) Date of Patent: May 24, 2011

(54) PACKET RELAY METHOD AND HOME AGENT

(75) Inventor: Takahiro Yoneda, Tokyo (JP)

(73) Assignee: Panasonic Corporation, Osaka (JP)

( * ) Notice: Subject to any disclaimer, the term of this patent is extended or adjusted under 35 U.S.C. 154(b) by 823 days.

(21) Appl. No.: 11/913,085

(22) PCT Filed: Apr. 25, 2006

(86) PCT No.: PCT/JP2006/308639
§ 371 (c)(1),
(2), (4) Date: Oct. 30, 2007

(87) PCT Pub. No.: WO2006/120893
PCT Pub. Date: Nov. 16, 2006

(65) Prior Publication Data
US 2009/0080352 A1    Mar. 26, 2009

(30) Foreign Application Priority Data

May 12, 2005    (JP) ................................. 2005-140243

(51) Int. Cl.
*H04W 4/00*    (2009.01)
*H04H 20/71*    (2008.01)
(52) U.S. Cl. ...................................... 370/312; 370/315
(58) Field of Classification Search ............ 370/312, 370/315, 328, 392, 492, 432, 390
See application file for complete search history.

(56) References Cited

U.S. PATENT DOCUMENTS

| 6,937,590 B2 * | 8/2005 | Lee ........................ 370/338 |
| 7,339,928 B2 * | 3/2008 | Choyi et al. ............ 370/390 |
| 2004/0223465 A1 * | 11/2004 | Lee et al. .............. 370/313 |

FOREIGN PATENT DOCUMENTS

| JP | 2000-354063 | 12/2000 |
| JP | 2004-120222 | 4/2004 |
| WO | 03/039076 | 5/2003 |
| WO | 03/047166 | 6/2003 |
| WO | 03/051002 | 6/2003 |

OTHER PUBLICATIONS

International Search Report Dated Aug. 1, 2006.

* cited by examiner

*Primary Examiner* — Brian D Nguyen
(74) *Attorney, Agent, or Firm* — Pearne & Gordon LLP

(57) ABSTRACT

The present invention is to reduce consumption of band resources and delay in communication as a whole. A functional configuration of a home agent according to the present invention will be described as follows. A Mobile IP protocol process portion 902 has a function of receiving/transmitting a registration request message/registration acknowledgement message about movement of a mobile host. An explicit multicast packet process portion 903 has a function of analyzing receivers' addresses written in an explicit multicast type packet, and a function for changing the packet. In addition, the explicit multicast packet process portion 903 has a function of transferring an explicit multicast packet when the packet to be transferred is not encapsulated with an IP header addressed to CoA of a mobile host in packet transfer to a packet-undelivered host. A Mobile IP packet transfer portion 904 has a function of encapsulating an explicit multicast type packet with an IP header addressed to CoA of a mobile host and transferring the encapsulated packet to the mobile host.

22 Claims, 15 Drawing Sheets

PACKET RELAY METHOD AND HOME AGENT

TECHNICAL FIELD

The present invention relates to a packet relay method and a home agent. Particularly, it relates to a packet relay method using Explicit Multicast on a mobile node such as a portable terminal and a node for managing the IP addresses of the mobile nodes.

BACKGROUND ART

Mobile IP defined in Non-Patent Document 1 and Non-Patent Document 2 is a communication protocol which is provided so that a node called mobile host can move among a plurality of networks while continuing communication. Mobile IP will be summarized as follows.
(Summary of Mobile IP)

In Mobile IP, a mobile host has a universal address called Home Address (hereinafter referred to as HoA) independent of a network to which the mobile host is connected, and a temporarily assigned address called Care of Address (hereinafter referred to as CoA) variable according to a network to which the mobile host is connected.

In Mobile IP, there is defined a node called Home Agent for transferring packets to the mobile host. A network where the home agent is present is called Home Network.

The mobile host transmits a Binding Update message (registration request message in Non-Patent Document 2) with written CoA to the home agent to register the position of the mobile host in the home agent whenever the mobile host moves from one network to another. Upon reception of the registration request message, the home agent transmits a Binding Acknowledge message (registration acknowledge message in Non-Patent Document 2) to the mobile host.

A node called Foreign Agent is defined in Non-Patent Document 2. When a foreign agent is present on the destination network to which the mobile host has moved, the foreign agent performs processing on the aforementioned registration request message and registration acknowledge message between the home agent and the mobile node. The foreign agent relays packet transfer from the home agent to the mobile host as will be described later.

The foreign agent performs some aids for communication between the mobile host connected to the destination network and the home agent. The mobile host and the home agent can however communicate with each other even in the absence of the foreign agent. At the present time, therefore, Mobile IPv4 is often developed on the assumption that there is no foreign agent. In Mobile IPv6, there is no foreign agent (e.g. see Non-Patent Document 1).

For transmitting a packet from the mobile host to another communication host, the packet is transmitted from the mobile host to the communication host directly or indirectly through the home agent.

Since the Binding Update message is functionally synonymous with the registration request message and the Binding Acknowledge message is functionally synonymous with the registration acknowledge message, hereinafter the registration request message will be described as Binding Update message and the registration acknowledge message will be described as Binding Acknowledge message.

In Non-Patent Document 1 and Non-Patent Document 2, for transmission of a packet from the communication host to the mobile host, the communication host designates the HoA of the mobile host as a destination address of the packet and transmits the packet to the mobile host. When the mobile host is absent on the home network but has registered its CoA in the home agent, the packet transmitted from the communication host is intercepted by the home agent on the home network, then given an IP header with the CoA of the mobile host designated as a destination address of the packet, and transferred to the mobile host.

When a Binding Update message transmitted from the mobile host to the communication host can be interpreted by the communication host, the communication host can designate the CoA of the mobile host as a destination address to thereby transmit a packet to the mobile host directly.
(Explicit Multicast System)

Next, an explicit multicast system will described. The explicit multicast system is a multicast system in which a transmitter designates plural receiver's addresses are written in an option header or payload (body of data) of a packet in multicast communication for delivering the packet from the transmitter to the plural receivers.

In the explicit multicast system, the transmitter writes the receivers' addresses in the option header or payload after an IP header and sends out the packet. Incidentally, in this description, a simple expression "packet" means a packet in the explicit multicast system.

A packet forwarding apparatus (hereinafter referred to as router) for supporting the explicit multicast system searches a unicast routing table of the router in accordance with packet-undelivered receivers' addresses written in the packet arriving at the router and gets next hop information. When next hops are different with respect to the packet-undelivered receivers' addresses as will be described later, replicas of the packet are made to prepare a number of packets corresponding to the number of next hops so that the packets are outputted to delivery interfaces corresponding to the next hops.

On this occasion, the router regards receivers' addresses other than the receivers' addresses having one and the same next hop, as packet-delivered addresses on the basis of a result of the searching of the unicast routing table in each of packets sent from the delivery interfaces, so that the router gives delivered marks to the packet-delivered receivers' addresses or deletes the packet-delivered receivers' addresses from the packet.

In the case where a destination address of an IP header of a packet intended to be sent from each interface is a packet-delivered receiver's address, the router selects one from other receivers' (hereinafter referred to as packet-undelivered receivers') addresses than the receivers' addresses regarded as packet-delivered receivers' addresses and writes the selected receiver address as a destination address of the IP header. The router repeats the aforementioned series of processes on the packet-undelivered receivers' addresses as a packet relay process to thereby prevent loop occurrence or duplicate delivery in the packet delivery.

On the other hand, a router not supporting the explicit multicast system performs ordinary unicast routing while referring to only the IP header of the packet.

When the packet then arrives at the receiver, the receiver copies the packet if any packet-undelivered receiver is present in a list of addresses in the packet. One is selected from the packet-undelivered receivers' addresses in the receivers' addresses, and the packet is sent with the selected address as a destination.

The aforementioned mechanism allows the packet to be multicast to all the receivers even when the router on a path does not support the explicit multicast system.

As a typical explicit multicast system, there is an Explicit Multicast system described in Patent Document 1 or Non-Patent Document 3 (hereinafter referred to as XCAST system).

There however arise some problems in the case where the HoA of the mobile host in the Mobile IP is designated in the receivers' addresses written in the packet in the explicit multicast system, because communication using the explicit multicast system is not assumed in the Mobile IP.

Description will be made below with reference to FIGS. 1 to 3 on the assumption that an XCAST system on IPv6 is used as the explicit multicast system. FIG. 1 is a network configuration view. FIG. 2 is a communication sequence view in the background art. FIG. 3 is an XCAST packet configuration view.

In FIG. 1, a source host 100 which serves as a transmitter is connected to a network 106, and a mobile host (receiver a) 102 which serves as a receiver is connected to a destination network 108. A mobile host (receiver b) 103 is connected to a destination network 109, and a receiver c 104 and a receiver d 105 as other hosts are connected to a network 110. A home agent 101 connected to a home network 107 manages the mobile host (receiver a) 102 and the mobile host (receiver b) 103.

The packet format on this occasion is shown in FIG. 3. Reference numerals 302 to 305 designate fields where receivers' addresses are written respectively. Bitmap 301 has bits which correspond to the receivers' addresses written in the fields 302 to 305, in order of bit position from the leading bit. Bitmap 301 is information for indicating whether the packet has been undelivered or delivered to each receiver.

A communication sequence on this occasion is shown in FIG. 2. Nodes on the sequence shown in FIG. 2 correspond to the nodes in FIG. 1 respectively. Assume that there is no router supporting the XCAST on a path from the source host 100 to the home agent, a path from the mobile host (receiver a) 102 to the host (receiver c) 104, and a path from the host (receiver c) 104 to the home agent 101.

(Source Host→Home Agent)

First, the source host 100 transmits a packet 200 which is obtained by setting the address HoAa 302 of the first receiver as a destination address of the IP header 300 at the time of creation of the packet.

(Home Agent→Receiver a)

Next, the home agent 101 intercepts the packet 200 transmitted onto the home network 107, then encapsulates the packet 200 with an IP header of CoAa, i.e. CoA of the mobile host (receiver a) 102 set as a destination, and transfers the encapsulated packet to the mobile host (receiver a) 102.

(Receiver a→Receiver c)

Upon reception of the packet 201, the mobile host (receiver a) 102 changes a bit of Bitmap 301 corresponding to the HoAa 302 in the packet to a value indicating that the packet has been delivered, and checks the Bitmap 301. If there is any packet-undelivered receiver on this occasion, the mobile host (receiver a) 102 transmits a packet 202 by designating an address Ac 303 of the host (receiver c) 104 which will be the first receiver, as a destination address of the IP header 300 of the packet.

(Receiver c→Home Agent)

Upon reception of the packet 202, the host (receiver c) 104 changes a bit of the Bitmap 301 corresponding to the Ac 303 in the packet to a value indicating that the packet has been delivered, and checks the Bitmap 301. If there is any packet-undelivered receiver on this occasion, the host (receiver c) 104 transmits a packet 203 by designating an address HoAb 304 of the mobile host (receiver b) 103 which will be the first receiver, as a destination address of the IP header 300 of the packet.

(Home Agent→Receiver b)

The home agent 101 intercepts the packet 203 transmitted onto the home network 107, then encapsulates a packet 204 with an IP header of CoAb, i.e. CoA of the mobile host (receiver b) 103 set as a destination, and transfers the encapsulated packet 204 to the mobile host (receiver b) 103.

(Receiver b→Receiver d)

Upon reception of the packet 204, the mobile host (receiver b) 103 changes a bit of the Bitmap 301 corresponding to the HoAb 304 in the packet to a value indicating that the packet has been delivered, and checks the Bitmap 301. If there is any packet-undelivered receiver on this occasion, the mobile host (receiver b) 103 transmits a packet 205 by designating an address Ad 305 of the host (receiver d) 105 which will be the first receiver, as a destination address of the IP header 300 of the packet.

Upon reception of the packet 205, the host (receiver d) 105 changes a bit of the Bitmap 301 corresponding to the Ad 305 in the packet to a value indicating that the packet has been delivered, and checks the Bitmap 301. If the packet has been delivered to all the receivers on this occasion, the host (receiver d) 105 does not transmit a packet any more.

Patent Document 1: JP-A-2000-354063

Non-Patent Document 1: D. Johnson, C. Perkins and J. Arkko, "Mobility Support in IPv6" Request for Comment 3775 (RFC3775), June 2004

Non-Patent Document 2: C. Perkins, "IP Mobility Support", Request for Comment 2002 (RFC2002), October 1996

Non-Patent Document 3: Internet-Draft (draft-ooms-xcast-basic-spec-05.txt)

DISCLOSURE OF THE INVENTION

Problem that the Invention is to Solve

Since the HoA of the mobile hosts are designated as the receivers' addresses in the aforementioned operation, it is however necessary to pass through one and the same home agent twice (200-201 and 203-204) when the packet is delivered to the mobile host (receiver a) 102 and the mobile host (receiver b) 103. This increases consumption of band resources and delay in the communication as a whole.

The invention has, as its object, provision of a packet relay method and a home agent which can reduce consumption of band resources and delay in communication as a whole when the communication using an explicit multicast system on Mobile IP is performed.

Means for Solving the Problem

The packet relay method according to the present invention is a packet relay method for relaying an explicit multicast type packet with one or more receivers' addresses written as a list of receivers' addresses in mobile nodes movable among networks and a home agent for managing home and destination addresses of one or more mobile nodes, wherein when the home agent receives an explicit multicast type packet in which any one of home addresses of mobile hosts managed by the home agent is designated as a destination address of the packet, the home agent analyzes packet-undelivered receivers' addresses written in a list of receivers' addresses in the packet as to whether home address(es) of one or more mobile nodes managed by the home agent are contained or not, and rewrites the home address(es) to corresponding destination address(es).

In the packet relay method according to the present invention, the home agent encapsulates the packet with an IP header addressed to a destination address of the mobile node designated by the destination address of the packet, and transfers the encapsulated packet to the mobile node.

According to the aforementioned configuration, when the home addresses of the mobile nodes managed by the home agent are contained in the receivers' addresses of the packet, the number of times the aforementioned packet is routed through the home agent is reduced to one, as compared with the background art. Thus, consumption of band resources in the network as a whole and delay in delivery of the packet can be reduced.

In the packet relay method according to the present invention, the home agent rewrites the home address of the mobile node designated by the destination address of the packet to a destination address of the mobile node, and transfers the packet to the mobile node.

According to the aforementioned configuration, in the case where a router supporting an explicit multicast system is present, multicast routing is performed properly so that efficiency of a delivery path in the explicit multicast system can be increased.

The packet relay method according to the present invention is a packet relay method for relaying an explicit multicast type packet with one or more receivers' addresses written as a list of receivers' addresses in mobile nodes movable among networks and a home agent for managing home and destination addresses of one or more mobile nodes, wherein when the home agent receives an explicit multicast type packet in which any one of home addresses of mobile hosts managed by the home agent is designated as a destination address of the packet, the home agent analyzes packet-undelivered receivers' addresses written in a list of receivers' addresses in the packet as to whether home address(es) of one or more mobile nodes managed by the home agent are contained or not, and rewrites the home address(es) to corresponding destination address(es).

In the packet relay method according to the present invention, when the mobile nodes are connected to one and the same destination network, the home agent arranges the destination addresses of the mobile nodes side by side.

In the packet relay method according to the present invention, the home agent encapsulates the packet with an IP header addressed to a destination address of the mobile node designated by the destination address of the packet, and transfers the encapsulated packet to the mobile node.

According to the aforementioned configuration, when the home addresses of the mobile nodes managed by the home agent are contained in the receivers' addresses of the packet, the number of times the aforementioned packet is routed through the home agent is reduced to one, as compared with the background art. Thus, consumption of band resources in the network as a whole and delay in delivery of the packet can be reduced. In addition, when home addresses of a plurality of mobile nodes connected to one and the same destination network are contained in the packet, the packet is transferred by priority among the mobile nodes connected to one and the same destination network. Thus, consumption of band resources in the network as a whole and delay in delivery of the packet can be reduced, as compared with the background art.

In the packet relay method according to the present invention, the home agent rewrites the home address of the mobile node designated by the destination address of the packet to a destination address of the mobile node, and transfers the packet to the mobile node.

According to the aforementioned configuration, in the case where a router supporting an explicit multicast system is present, multicast routing is performed properly so that efficiency of a delivery path in the explicit multicast system can be increased.

The packet relay method according to the present invention is a packet relay method for relaying an explicit multicast type packet with one or more receivers' addresses written as a list of receivers' addresses in mobile nodes movable among networks and a home agent for managing home and destination addresses of one or more mobile nodes, wherein when the home agent receives an explicit multicast type packet in which any one of home addresses of mobile hosts managed by the home agent is designated as a destination address of the packet, the home agent analyzes packet-undelivered receivers' addresses written in a list of receivers' addresses in the packet as to whether home address(es) of one or more mobile nodes managed by the home agent are contained or not, and makes a number of replicas of the packet corresponding to the number of the mobile nodes when the home address(es) of the one or more mobile nodes are contained.

In the packet relay method according to the present invention, the home agent rewrites destination addresses of the replicas of the packet corresponding to the number of the mobile nodes, to the home addresses of the mobile nodes respectively, sets other addresses than the home address designated as a destination, as packet-delivered addresses in a receiver address list in each replica of the packet, encapsulates the packet with an IP header addressed to a destination address of the mobile node designated by the destination address of the packet, and transfers the encapsulated packet to the mobile node.

According to the aforementioned configuration, when the home addresses of the mobile nodes managed by the home agent are contained in the receivers' addresses of the packet, the number of times the aforementioned packet is routed through the home agent is reduced to one, as compared with the background art. Thus, delay in delivery of the packet can be reduced.

In the packet relay method according to the present invention, the home agent rewrites destination addresses of the replicas of the packet corresponding to the number of the mobile nodes, to the destination addresses of the mobile nodes respectively, changes the home address of the mobile node designated as a destination, to the destination address of the mobile node in a receiver address list in each replica of the packet, sets other addresses than the address of the mobile node designated as a destination, as packet-delivered addresses, and transfers the packet to the mobile node.

According to the aforementioned configuration, the size of a payload which can be used by an application in one packet can be prevented form being reduced.

In the packet relay method according to the present invention, the home agent sets all home addresses of one or more mobile nodes managed by the home agent, as packet-delivered addresses in the receiver address list in the received packet, searches a home agent's unicast routing table concerned with packet-undelivered addresses in the receiver address list to thereby gets next hop information, copies the packet to prepare a number of replicas of the packet corresponding to the number of next hops when the next hops are different with respect to the packet-undelivered receivers' addresses, and transmits the replicas of the packet to delivery interfaces corresponding to the next hops respectively.

In the packet relay method according to the present invention, the home agent sets all home addresses of one or more mobile nodes managed by the home agent, as packet-delivered addresses in the receiver address list in the received packet, and transmits the packet by designating one of the packet-undelivered addresses in the receiver address list, as a destination address of the packet.

The packet relay method according to the present invention is a packet relay method for relaying an explicit multicast type packet with one or more receivers' addresses written as a list of receivers' addresses in mobile nodes movable among networks and a home agent for managing home and destination addresses of one or more mobile nodes, wherein when the home agent receives an explicit multicast type packet in which any one of home addresses of mobile hosts managed by the home agent is designated as a destination address of the packet, the home agent analyzes packet-undelivered receivers' addresses written in a list of receivers' addresses in the packet as to whether home address(es) of one or more mobile nodes managed by the home agent are contained or not, and makes a number of replicas of the packet corresponding to the number of destination networks to which the mobile nodes are connected when the home addresses of the mobile nodes managed by the home agent are contained in the list of receivers' addresses in the received packet.

In the packet relay method according to the present invention, the home agent rewrites the destination address of each of the replicas of the packet corresponding to the number of destination networks to which the mobile hosts are connected, to a home address of one of mobile nodes connected to each of the destination networks, changes home addresses of the mobile nodes connected to one and the same destination network to corresponding destination addresses of the mobile nodes in the list of receivers' addresses in the packet, sets other addresses than the addresses of the mobile nodes connected to one and the same destination network, as packet-delivered addresses, encapsulates the packet with an IP header addressed to the destination address of the mobile node designated by the destination address of the packet, and transfers the encapsulated packet to the mobile node.

According to the aforementioned configuration, when the home addresses of the mobile nodes managed by the home agent are contained in the receivers' addresses of the packet, the number of times the aforementioned packet is routed through the home agent is reduced to one, as compared with the background art. Thus, delay in delivery of the packet can be reduced while band resources consumed in the network as a whole is saved.

In the packet relay method according to the present invention, the home agent rewrites the destination address of each of the replicas of the packet corresponding to the number of destination networks to which the mobile hosts are connected, to a destination address of one of mobile nodes connected to each of the destination networks, changes home addresses of the mobile nodes connected to one and the same destination network to corresponding destination addresses of the mobile nodes in the list of receivers' addresses in the packet, sets other addresses than the addresses of the mobile nodes connected to one and the same destination network, as packet-delivered addresses, and transfers the packet to the mobile node.

According to the aforementioned configuration, efficiency of a delivery path in an explicit multicast system can be increased without reducing the size of a payload which can be used in one packet by an application.

Effect of the Invention

According to the present invention, receivers in an explicit multicast system are mobile hosts. When home addresses of the mobile hosts are designated in receivers' addresses in a packet in the explicit multicast system, consumption of band resources and delay in communication as a whole can be reduced.

In communication between a home agent and the mobile hosts, forbiddance of transmission beyond a MTU (Maximum Transmission Unit) and reduction of a field of a payload which can be used by an application can be prevented, and efficiency of a delivery path in the explicit multicast system can be increased.

DESCRIPTION OF REFERENCE NUMERALS

Figure 1:
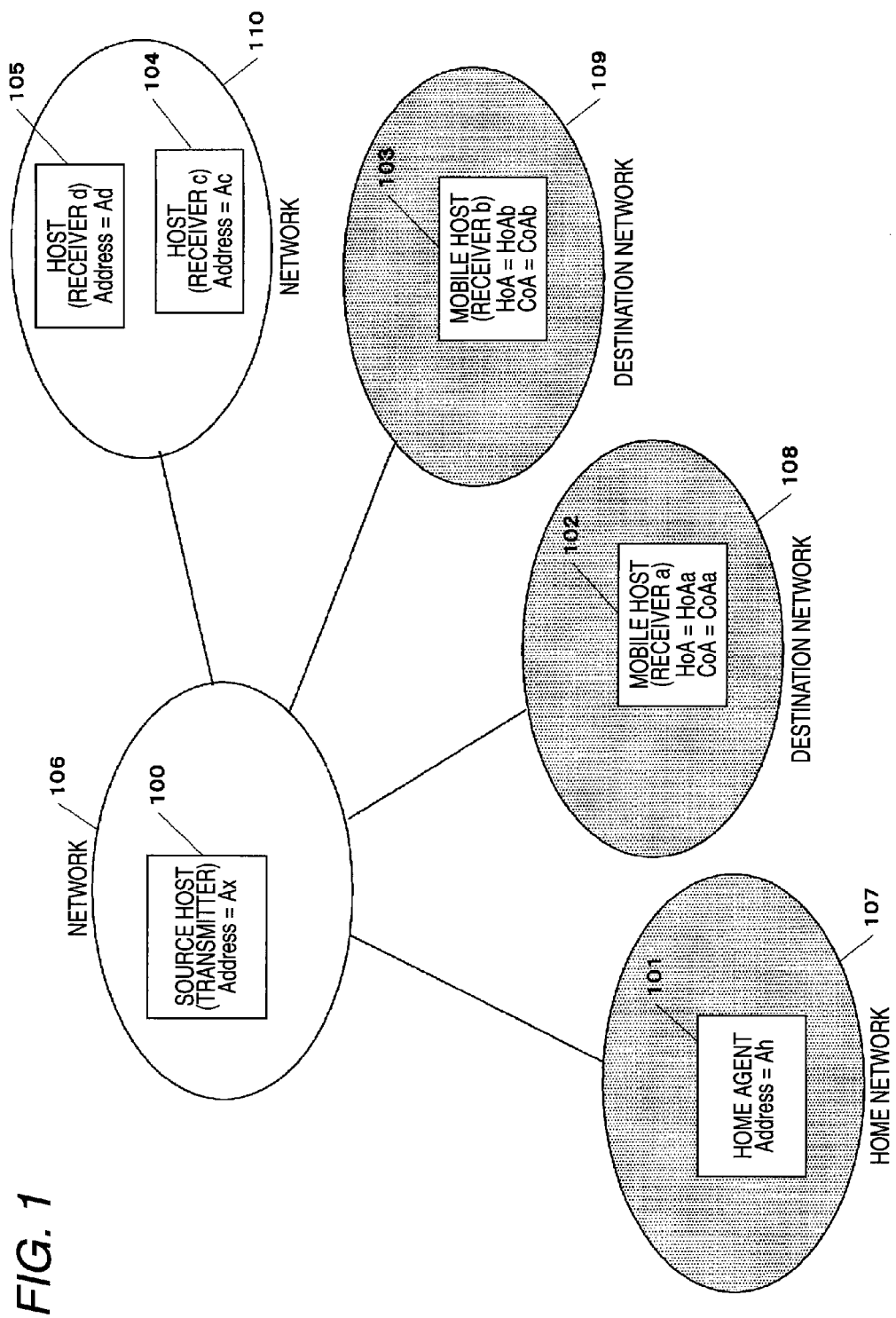
FIG. 1 A network configuration view concerned with the background art, the first embodiment and the third embodiment.

100, 600 source host (transmitter)
101, 601 home agent
102, 602 mobile host (receiver a)
103, 603 mobile host (receiver b)
104, 604 mobile host (receiver c)
105, 605 mobile host (receiver d)
106, 110, 606, 610 network
107, 607 home network
108, 109, 608, 609 destination network
900, 1300 home agent
901, 1301 Mobile IP communication process portion
902, 1032 Mobile IP protocol process portion
903, 1303 explicit multicast packet process portion
904, 1304 Mobile IP packet transfer process portion

BEST MODE FOR CARRYING OUT THE INVENTION

Embodiments of the present invention will be described below specifically with reference to the drawings. Although description will be made below particularly on the assumption that an XCAST system is used as the explicit multicast system, this is simply for description of specific embodiments. The present invention is, however, not necessarily limited to the XCAST system.

First Embodiment

Figure 3:
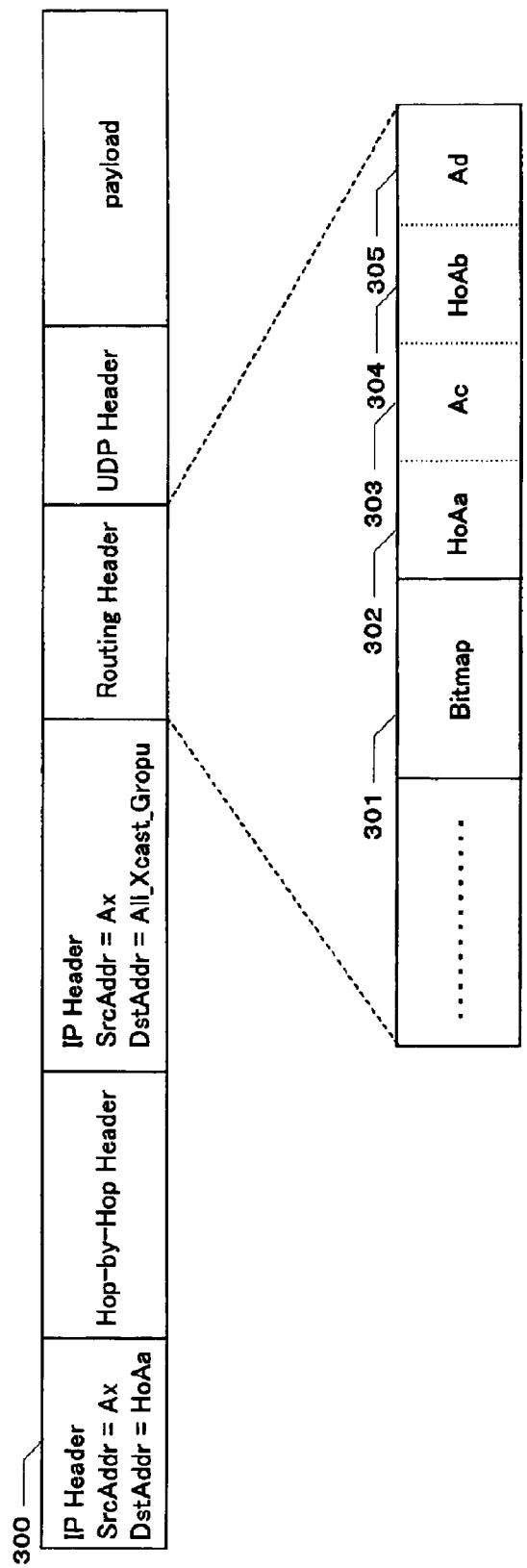
FIG. 3 A packet configuration view concerned with the background art, the first embodiment, the second embodiment, the third embodiment and the fourth embodiment.
Figure 4:
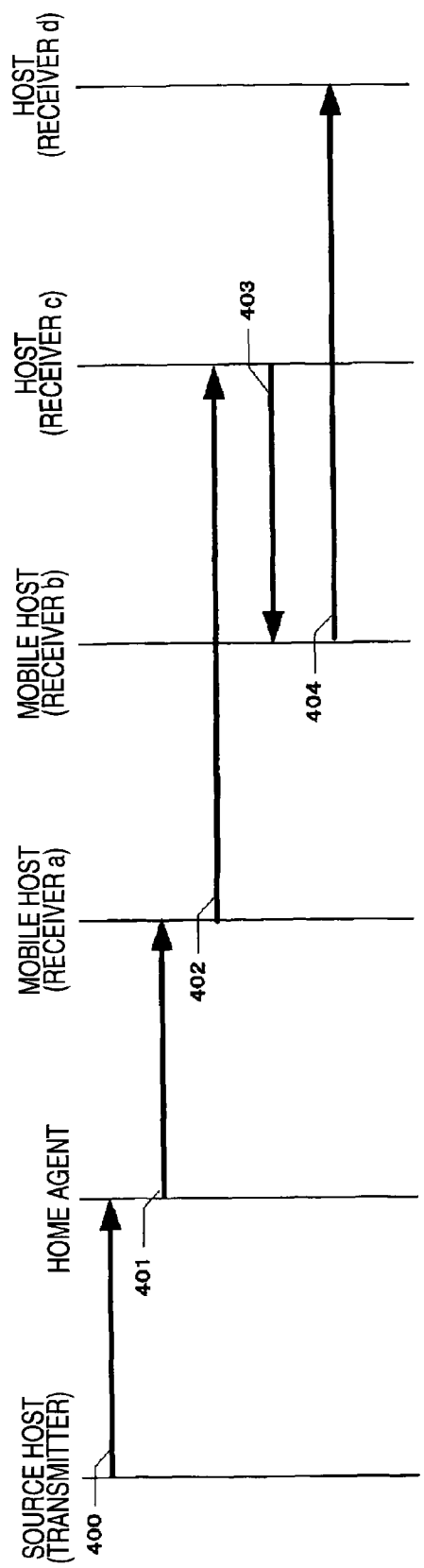
FIG. 4 A communication sequence view in the first embodiment.
Figure 5:
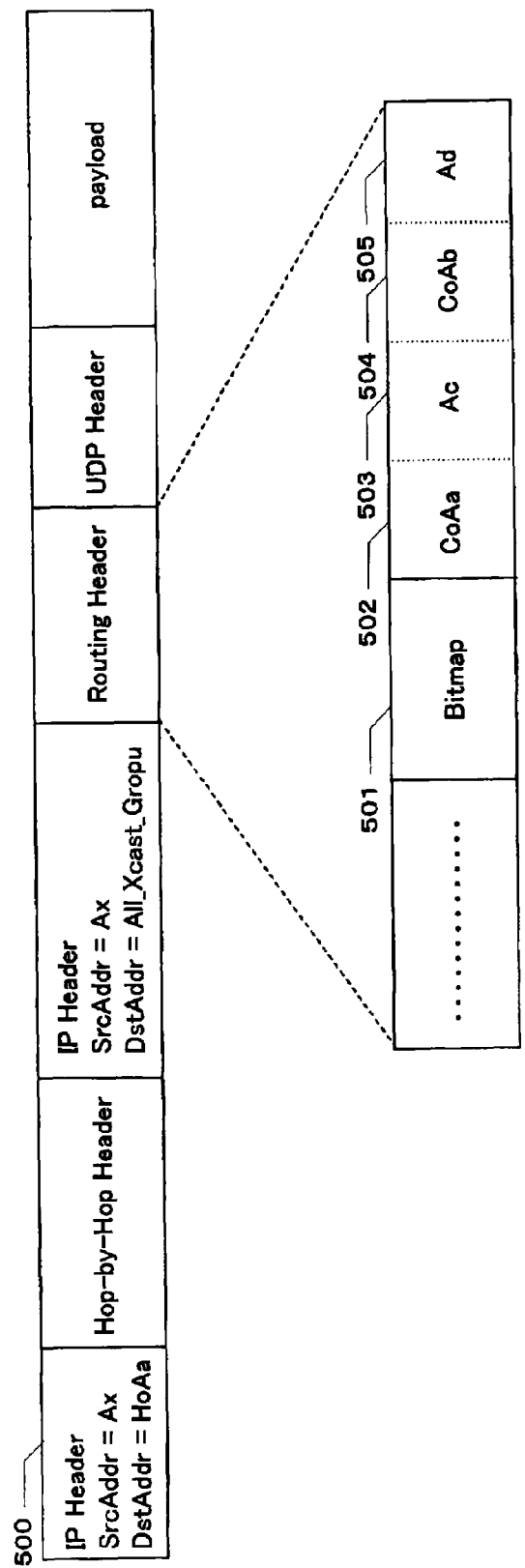
FIG. 5 A packet configuration view concerned with the first embodiment.

Description will be made on a processing example in the case where a first invention is applied to a home agent according to a first embodiment of the present invention. These operations will be described with reference to FIG. 1 and FIGS. 3 to 5. FIG. 1 is a network configuration view. FIG. 3 is an XCAST packet configuration view. FIG. 4 is a communication sequence view in the case of the first embodiment of the present invention. FIG. 5 is an XCAST packet configuration view.

(Source Host→Home Agent)

First, in a network configuration in FIG. 1, a home agent 101 manages a mobile host (receiver a) 102 and a mobile host (receiver 12) 103 and intercepts a packet 400 which is transmitted by a source host 100 and which is shown in FIG. 3.

(Home Agent→Receiver a)

Then, the home agent 101 analyzes the packet 400 as to whether any HoA managed by the home agent 101 is contained in packet-undelivered receivers' addresses 302 to 305 or not. On this occasion, because HoAa 302 and HoAb 304 satisfy the aforementioned condition, the HoAa 302 and the HoAb 304 are changed to CoAa 502 and CoAb 504 respectively, like a pocket shown in FIG. 5. The packet shown in FIG. 5 is encapsulated with an IP header addressed to the CoAa so that a packet 401 is transferred to the mobile host (receiver a) 102.

Here, encapsulation is a process for granting a new IP header to a certain IP packet. When, for example, an IP packet having an IP header A is encapsulated with an IP header B and then sent, an ordinary router performs routing by viewing the IP header B so as to deliver the packet to a destination address of the IP header B. On this occasion, because the IP header B is granted, the IP header A can be treated simply as data on a payload particularly when the encapsulated packet does not need to be recognized.

(Receiver a→Receiver c)

Upon reception of the packet 401, the mobile host (receiver a) 102 changes a bit of Bitmap 501 corresponding to the CoAa 502 in the packet to a value indicating that the packet has been delivered, and checks the Bitmap 501. On this occasion, when there is any packet-undelivered receiver, the mobile host (receiver a) 102 transmits a packet 402 by designating an address Ac 503 of a host (receiver c) 104 which will be the first receiver, as a destination address of an IP header 500 of the aforementioned packet.

(Receiver c→Receiver b)

Upon reception of the packet 402, the host (receiver c) 104 changes a bit of the Bitmap 501 corresponding to the Ac 503 in the aforementioned packet to a value indicating that the packet has been delivered, and checks the Bitmap 501. On this occasion, when there is any packet-undelivered receiver, the host (receiver c) 104 transmits a packet 403 by designating the address CoAb 504 of the mobile host (receiver b) 103 which will be the first receiver, as the destination address of the IP header 500 of the aforementioned packet.

(Receiver b→Receiver d)

Upon reception of the packet 403, the mobile host (receiver b) 103 changes a bit of the Bitmap 501 corresponding to the CoAb 504 in the aforementioned packet to a value indicating that the packet has been delivered, and checks the Bitmap 501. On this occasion, when there is any packet-undelivered receiver, the mobile host (receiver b) 103 transmits a packet 404 by designating an address Ad 505 of a host (receiver d) 505 which will be the first receiver, as the destination address of the IP header 500 of the aforementioned packet.

Upon reception of the packet 404, the host (receiver d) 105 changes a bit of the Bitmap 501 corresponding to the Ad 505 in the aforementioned packet to a value indicating that the packet has been delivered, and checks the Bitmap 501. On this occasion, the host (receiver d) 105 does not send a packet any more because the packet has been delivered to all the receivers.

Figure 2:
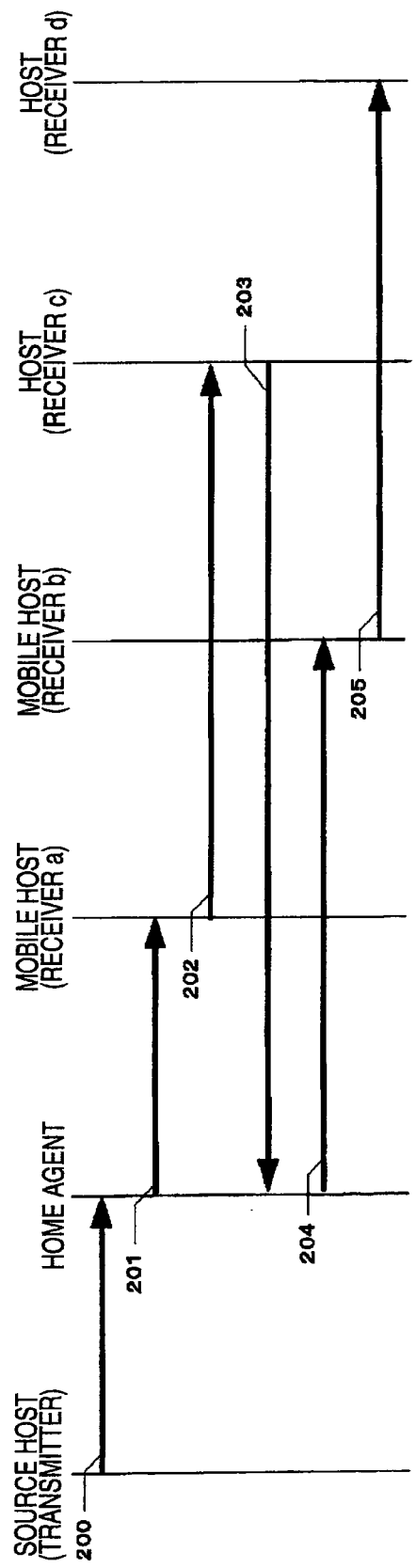
FIG. 2 A communication sequence view in the background art.

As described above, as compared with the operation example in the background art shown in FIG. 2, in the first embodiment, the number of times the aforementioned packet is routed through the home agent is reduced to one, so that consumption of band resources in the network as a whole and delay in delivery of the packet can be reduced.

Incidentally, in the first embodiment, when packet-undelivered receivers' addresses written in a packet intercepted by the home agent are searched with a result that HoA of one or more mobile hosts managed by the home agent are contained, each HoA is changed to corresponding CoA and the packet is transferred to a mobile host which is a destination of an IP header of the packet.

On this occasion, the home agent does not encapsulate the packet with an IP header addressed to CoA of the transfer destination mobile host, but changes the destination address of the IP header in the aforementioned packet from the HoA of the aforementioned mobile host to the CoA thereof to thereby transfer the packet to the aforementioned mobile host. Thus, a field of a payload which can be used by an application can be prevented from being reduced and efficiency of a delivery path in the explicit multicast system can be increased.

Configuration of Home Agent in First Embodiment

Figure 9:
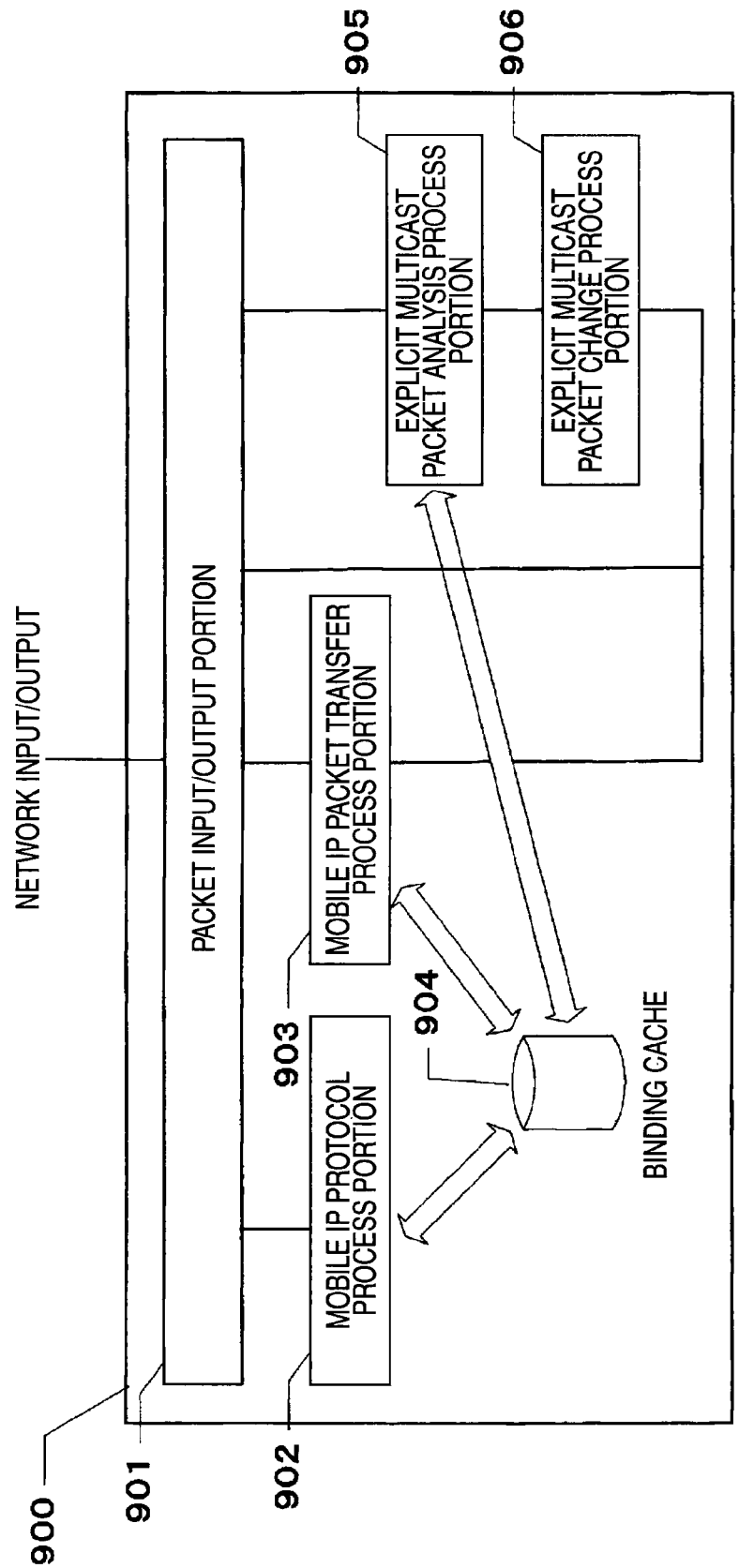
FIG. 9 A functional block diagram in the first embodiment.

A functional configuration concerned with the first embodiment of the present invention will be described below with reference to FIG. 9. A home agent 900 has a packet input/output (I/O) portion 901, a Mobile IP protocol process portion 902, a Mobile IP packet transfer process portion 903, a Binding cache 904, an explicit multicast packet analysis process portion 905, and an explicit multicast packet change process portion 906.

The packet I/O portion 901 receives a packet from a mobile host or a communication destination host, and transmits information to the respective portions in accordance with the received packet. The Mobile IP protocol process portion 902 has a function of receiving/transmitting a Binding Update message/Binding Acknowledgement message about movement of a mobile host. The Mobile IP protocol process portion 902 registers HoA and CoA of the mobile host in the Binding cache 904. The Mobile IP packet transfer process portion 903 has a function of encapsulating a packet which is intercepted by the home agent 900 and addressed to the HoA of the mobile host, with an IP header addressed to the CoA of the mobile host, and transferring the encapsulated packet to the mobile host.

The explicit multicast packet analysis process portion 905 has a function peculiar to the first invention to analyze a packet-undelivered receiver address list written in the packet in the explicit multicast system as to whether the HoA held in the Binding cache 904 is contained or not.

The explicit multicast packet change process portion 906 has a function peculiar to the first invention to change the address from the HoA to corresponding CoA when the HoA held in the Binding cache 904 is contained in the address list.

In addition, the explicit multicast packet change process portion 906 encapsulates a packet with an IP header and transfers the encapsulated packet to the mobile host through the Mobile IP packet transfer process portion 903.

In addition, the explicit multicast packet change process portion 906 may change the HoA designated as a destination address of the packet to corresponding CoA, and transfer the packet to the mobile host through the packet I/O portion 901 without encapsulating the packet with an IP header.

Second Embodiment

Figure 6:
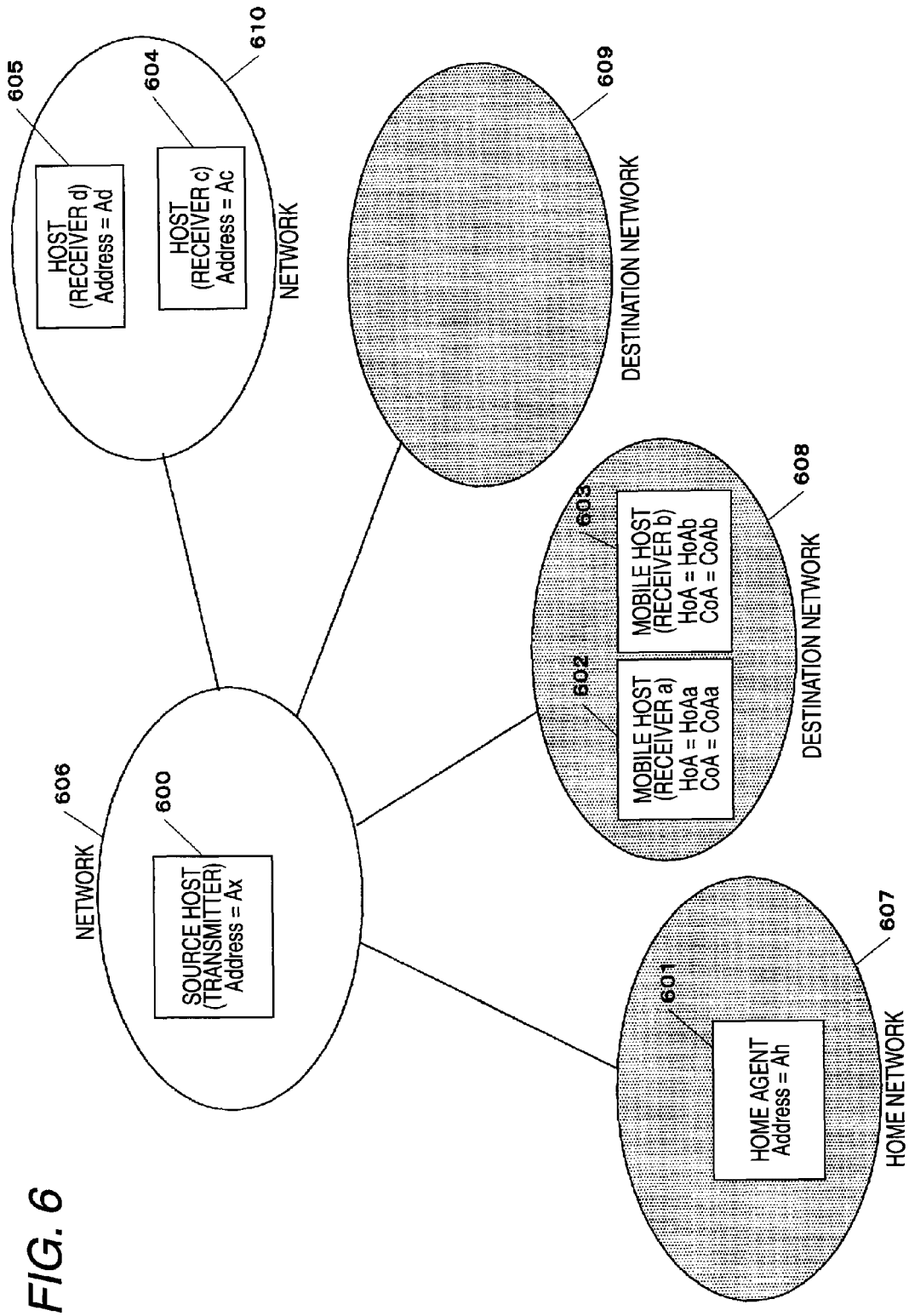
FIG. 6 A network configuration view concerned with the second embodiment.
Figure 7:
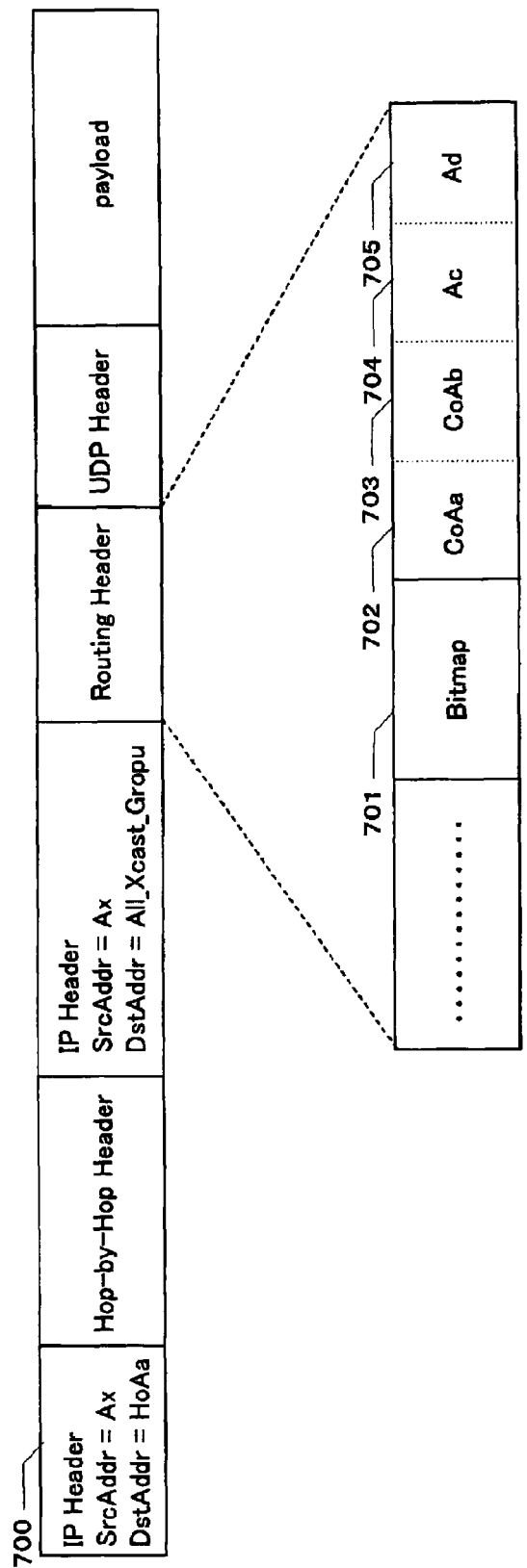
FIG. 7 A packet configuration view concerned with the second embodiment.
Figure 8:
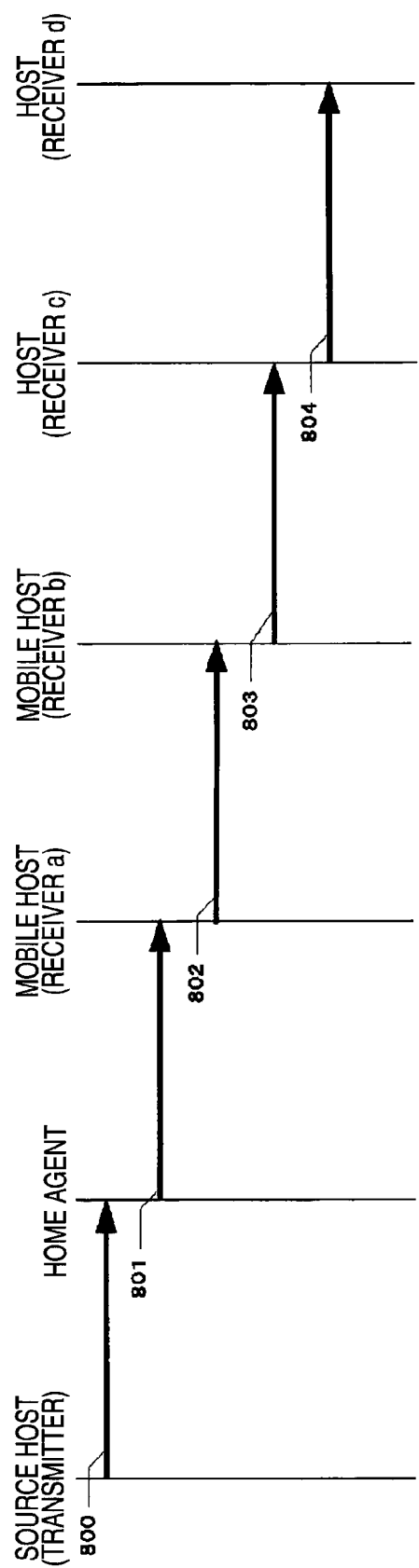
FIG. 8 A communication sequence view in the second embodiment.

Description will be made on a processing example in the case where a second invention is applied to a home agent according to a second embodiment of the present invention. This operation will be described specifically with reference to FIG. 3 and FIGS. 6 to 8. FIG. 3 is an XCAST packet configuration view. FIG. 6 is a network configuration view. FIG. 7 is an XCAST packet configuration view. FIG. 8 is a communication sequence view in the case of the second embodiment.

A network configuration view in the case where a mobile host (receiver a) 602 and a mobile host (receiver b) 603 are connected to one and the same destination network 608 is shown in FIG. 6. A source host 600 which serves as a transmitter is connected to a network 606. A receiver c 604 and a receiver d 605 which serve as other hosts are connected to a network 610. A home agent 601 connected to a home network 607 manages the mobile host (receiver a) 602 and the mobile host (receiver b) 603.

(Source Host→Home Agent)

First, the home agent 601 to which the present invention is applied intercepts a packet 800 which is sent from the source host 600 and which is shown in FIG. 3.

(Home Agent→Receiver a)

Then, the home agent 601 analyzes the packet 800 as to whether any HoA managed by the home agent 601 is contained in packet-undelivered receivers' addresses 302 to 305 or not. On this occasion, because HoAa 302 and HoAb 304 satisfy the aforementioned condition, each HoA is changed to corresponding CoA.

It is found from the corresponding CoA that the mobile host (receiver a) 602 and the mobile host (receiver b) are connected to one and the same destination network 608. For this reason, arrangement of the receivers' addresses and Bitmap information corresponding thereto is performed so that the HoAa 302 and HoAb 304 are changed to CoAa 702 and CoAb 703 respectively and located side by side, like a packet shown in FIG. 7. The packet shown in FIG. 7 is encapsulated with an IP header addressed to the CoAa 702 so that a packet 801 is transferred to the mobile host (receiver a) 602.

(Receiver a→Receiver b)

Upon reception of the packet 801, the mobile host (receiver a) 602 changes a bit of Bitmap 701 corresponding to the CoAa 702 in the packet to a value indicating that the packet has been delivered, and checks the Bitmap 701. On this occasion, when there is any packet-undelivered receiver, the mobile host (receiver a) 602 designates the address CoAb 703 of the mobile host (receiver b) 603 which will be the first receiver, as a destination address of an IP header 700 of the aforementioned packet, and sends a packet 802.

(Receiver b→Receiver c)

Upon reception of the packet 802, the mobile host (receiver b) 603 changes a bit of the Bitmap 701 corresponding to the CoAb 703 in the aforementioned packet to a value indicating that the packet has been delivered, and checks the Bitmap 701. On this occasion, when there is any packet-undelivered receiver, the mobile host (receiver b) 603 sends a packet 803 by designating an address Ac 704 of the host (receiver c) 604 which will be the first receiver, as the destination address of the IP header 700 of the aforementioned packet.

(Receiver c→Receiver d)

Upon reception of the packet 803, the host (receiver c) 104 changes a bit of the Bitmap 701 corresponding to the Ac 704 in the aforementioned packet to a value indicating that the packet has been delivered, and checks the Bitmap 701. On this occasion, when there is any packet-undelivered receiver, the host (receiver c) 104 sends a packet 804 by designating an address Ad 705 of the host (receiver d) 605 which will be the first receiver, as the destination address of the IP header 700 of the aforementioned packet.

Upon reception of the packet 804, the host (receiver d) 605 changes a bit of the Bitmap 701 corresponding to the Ad 705 in the aforementioned packet to a value indicating that the packet has been delivered, and checks the Bitmap 701. On this occasion, the host (receiver d) 605 does not send a packet any more because the packet has been delivered to all the receivers.

As described above, as compared with the operation example of the background art shown in FIG. 2, in the second embodiment, the number of times the aforementioned packet is routed through the home agent is reduced to one, so that consumption of band resources in the network as a whole and delay in delivery of the packet can be reduced. When HoA of one or more mobile hosts managed by the home agent per se are contained, each HoA is changed to corresponding CoA based on the Binding cache. When it is possible to determine from receivers' addresses that mobile hosts are connected to one and the same network, the corresponding CoA addresses can be arranged side by side. Thus, it is possible to further reduce delay in packet delivery, in comparison with the first embodiment.

Incidentally, in the second embodiment, the home agent intercepts a packet addressed to HoA of a mobile host. When packet-undelivered receivers' addresses written in the packet are searched with a result that HoA of one or more mobile hosts managed by the home agent are contained, the home agent performs the following operation. The home agent changes each HoA to corresponding CoA. When it is possible to determine from receivers' addresses that the receivers' addresses are connected to one and the same network, the home agent arranges the addresses side by side. Then, the home agent transfers the packet to the mobile host which is the destination address of the IP header of the packet.

On this occasion, the home agent does not encapsulate the packet with an IP header addressed to CoA of the transfer destination mobile host, but changes the destination address of the IP header in the aforementioned packet from the HoA of the aforementioned mobile host to the CoA thereof to thereby transfer the packet to the aforementioned mobile host. Thus, a field of a payload which can be used by an application can be prevented from being reduced, and efficiency of a delivery path in the explicit multicast system can be increased.

Configuration of Home Agent in Second Embodiment

Figure 14:
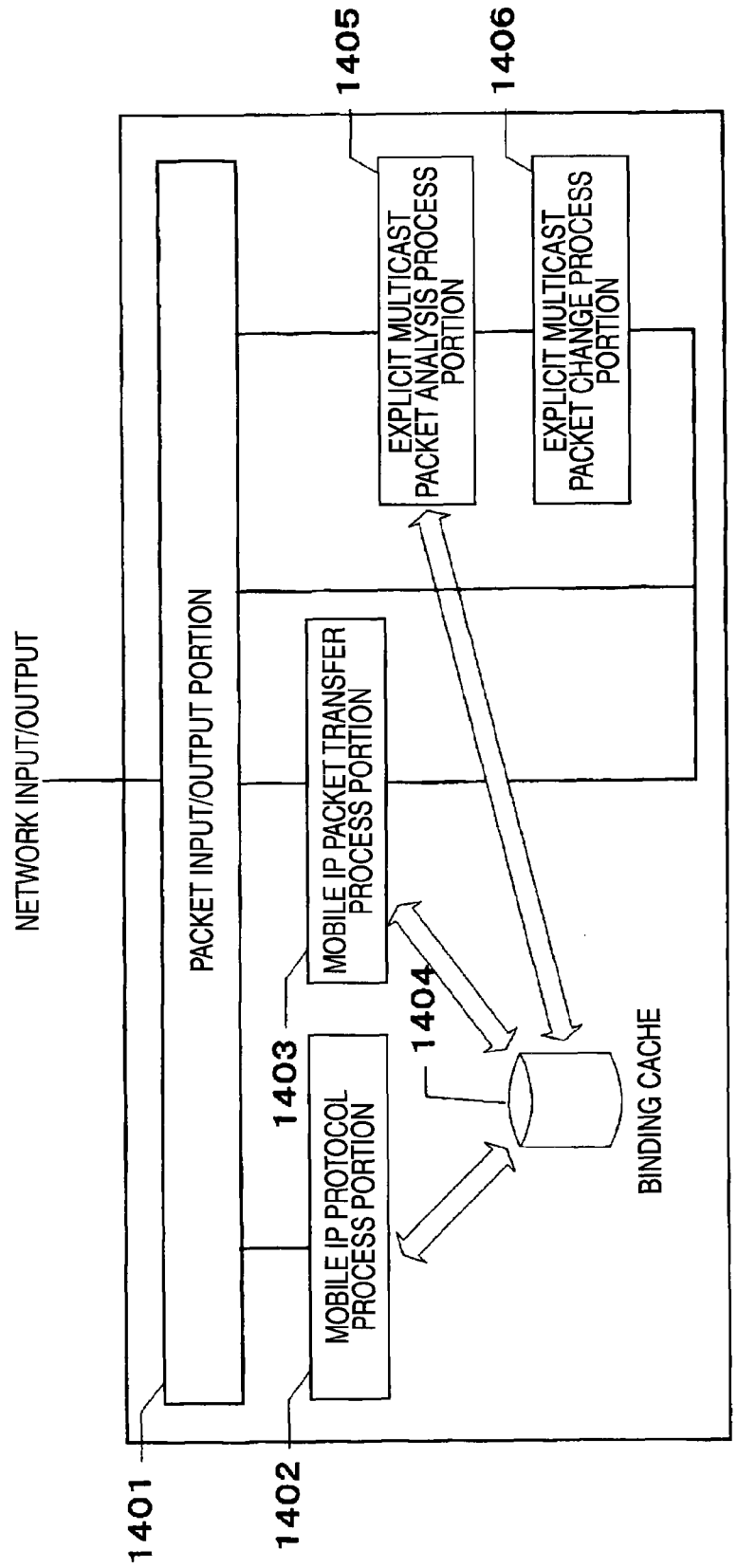
FIG. 14 A functional block diagram in the second embodiment.

A functional configuration concerned with the second embodiment of the present invention will be described below with reference to FIG. 14. A home agent 1400 has a packet input/output (I/O) portion 1401, a Mobile IP protocol process portion 1402, a Mobile IP packet transfer process portion 1403, a Binding cache 1404, an explicit multicast packet analysis process portion 1405, and an explicit multicast packet change process portion 1406.

The packet I/O portion 1401 receives a packet from a mobile host or a communication destination host, and transfers information to the respective portions in accordance with the received packet. The Mobile IP protocol process portion 1402 has a function of receiving/transmitting a Binding Update message/Binding Acknowledgement message about movement of a mobile host. The Mobile IP protocol process portion 1402 registers HoA and CoA of the mobile host in the Binding cache 1404. The Mobile IP packet transfer process portion 1403 has a function of encapsulating a packet which is intercepted by the home agent 1400 and addressed to the HoA of the mobile host, with an IP header addressed to the CoA of the mobile host, and transferring the encapsulated packet to the mobile host.

The explicit multicast packet analysis process portion 1405 has a function peculiar to the second invention to analyze a packet-undelivered receiver address list written in the packet in the explicit multicast system as to whether the HoA held in the Binding cache 1404 is contained or not.

The explicit multicast packet change process portion 1406 has a function peculiar to the second invention to change the address from the HoA to corresponding CoA when the HoA held in the Binding cache 1404 is contained in the address list. When a plurality of mobile nodes are connected to one and the same destination network, the explicit multicast packet change process portion 1406 arranges the CoA of the plurality of the destination nodes side by side.

In addition, the explicit multicast packet change process portion 1406 encapsulates the packet with an IP header and transfers the encapsulated packet to the mobile host through the Mobile IP packet transfer process portion 1403.

In addition, the explicit multicast packet change process portion 1406 may change the HoA designated as the destination address of the packet to corresponding CoA, and transfer the packet to the mobile host through the packet I/O portion without encapsulating the packet with an IP header.

Third Embodiment

Figure 10:
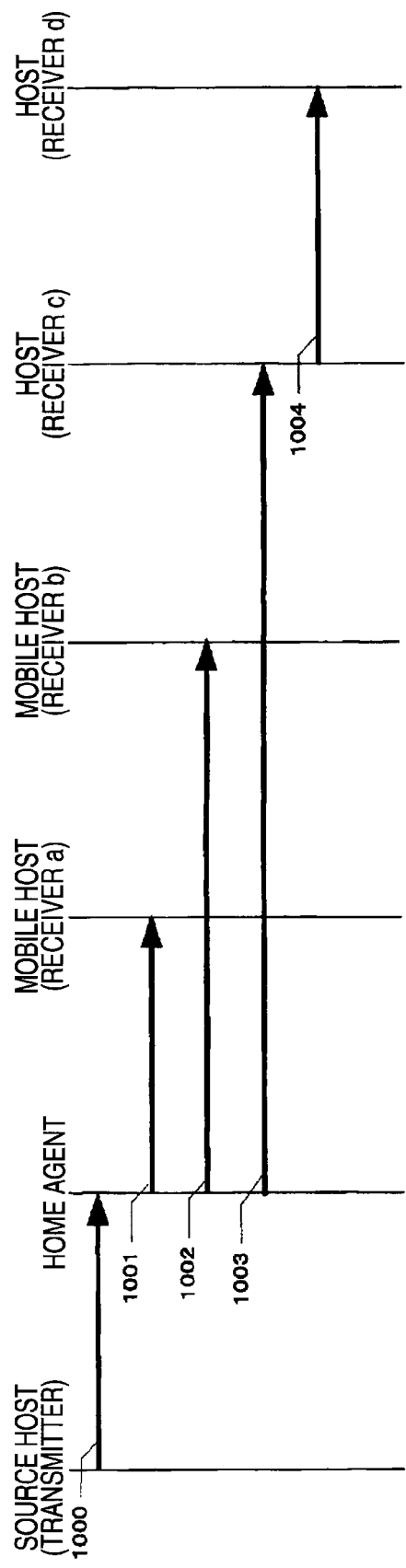
FIG. 10 A communication sequence view in the third embodiment.

Description will be made on a processing example in the case where a third invention is applied to a home agent according to a third embodiment of the present invention. This operation will be described specifically with reference to FIG. 1, FIG. 3 and FIG. 10. FIG. 1 is a network configuration view. FIG. 3 is an XCAST packet configuration view. FIG. 10 is a communication sequence view in the case of the third embodiment.

(Source Host→Home Agent)

First, in a network configuration in FIG. 1, a home agent 101 to which the present invention is applied manages a mobile host (receiver a) 102 and a mobile host (receiver b) 103 and intercepts a packet 1000 which is sent from a source host 100 and which is shown in FIG. 3. The packet 1000 intercepted by the home agent 101 is transferred after applied to predetermined processes as will be described later.

Then, the home agent 101 analyzes the packet 1000 as to whether any HoA managed by the home agent 101 is contained in packet-undelivered receivers' addresses 302 to 305 or not. On this occasion, because HoAa 302 and HoAb 304 satisfy the aforementioned condition, the home agent 101 copies the packet twice (a packet 1001 and a packet 1002 in FIG. 10).

(Home Agent→Receiver a)

The home agent 101 rewrites a destination address of an IP header 300 of the first copied packet to the HoAa 302. The home agent 101 changes each of bits of Bitmap 301 corresponding to Ac 303, the HoAb 304 and Ad 305 to a value indicating that the packet has been delivered, and additionally grants an IP header addressed to CoAa. Then, the home agent 101 sends the packet 1001 to the mobile host (receiver a) 102.

(Home Agent→Receiver b)

The home agent 101 rewrites a destination address of an IP header 300 of the second copied packet to the HoAb 304. The home agent 101 changes each of bits of Bitmap 301 corresponding to the HoAa 302, the Ac 303 and the Ad 305 to a value indicating that the packet has been delivered, and additionally grants an IP header addressed to CoAb. Then, the home agent 101 sends the packet 1002 to the mobile host (receiver b) 103.

(Home Agent→Receiver c)

The home agent 101 searches a home agent's unicast routing table for sending the intercepted packet 1000 to the Ac 303 and the Ad 305 as the packet-undelivered receivers' addresses except the HoAa 302 and the HoAb 304, so as to get next hop information.

When the Ac 303 and the Ad 305 have the same next hop as a result of the aforementioned process, the home agent 101 determines that it is not necessary to copy the aforementioned packet. The home agent 101 changes each of bits of the Bitmap 301 corresponding to the HoAa 302 and the HoAb 304 to a value indicating that the packet has been delivered, changes the destination address of the packet to the Ac 303, and sends a packet 1003 to a corresponding delivery interface.

Upon reception of the packet 1001, the mobile host (receiver a) 102 changes a bit of the Bitmap 301 corresponding to the HoAa 302 in the packet to a value indicating that the packet has been delivered, and checks the Bitmap 301. On this occasion, the mobile host (receiver a) 102 does not send a packet any more because the packet has been delivered to all the receivers.

Upon reception of the packet 1002, the mobile host (receiver b) 103 changes a bit of the Bitmap 301 corresponding to the HoAa 304 in the packet to a value indicating that the packet has been delivered, and checks the Bitmap 301. On this occasion, the mobile host (receiver b) 103 does not send a packet any more because the packet has been delivered to all the receivers.

(Receiver c to Receiver d)

Upon reception of the packet 1003, the host (receiver c) 104 changes a bit of the Bitmap 301 corresponding to the Ac 303 in the aforementioned packet to a value indicating that the packet has been delivered, and checks the Bitmap 301. On this occasion, when there is any packet-undelivered receiver, the host (receiver c) 104 sends a packet 1004 by designating the address Ad 305 of a host (receiver d) 105 which will be the first receiver, as the destination address of the IP header 300 of the aforementioned packet.

Upon reception of the packet 1004, the host (receiver d) 105 changes a bit of the Bitmap 301 corresponding to the Ad 305 in the aforementioned packet to a value indicating that the packet has been delivered, and checks the Bitmap 301. On this occasion, the host (receiver d) 105 does not send a packet any more because the packet has been delivered to all the receivers.

As described above, the third embodiment is different from the operation example in the background art in that when the home agent analyzes packet-undelivered receivers' addresses written in a packet in an explicit multicast system with a result that HoA of one or more mobile hosts managed by the home agent are contained, the packet is copied so that a number of replicas of the packet corresponding to the number of the mobile hosts are made and sent to the mobile hosts respectively.

The home agent regards the HoA of each mobile host managed by the home agent as a packet-delivered address, and successively searches the home agent's unicast routing table in accordance with each residual packet-undelivered receiver address so as to get next hop information. When the next hops are different with respect to the packet-undelivered receivers' addresses, the home agent copies the packet so as to prepare a number of replicas of the packet corresponding to the number of next hops. The home agent sends the replicas of the packet to delivery interfaces corresponding to the next hops, respectively.

Delay in packet delivery can be reduced by the aforementioned operation.

In the transfer method according to the background art, packet delivery is interrupted due to movement of a mobile host when the packet is being delivered in a daisy chain delivery manner. That is, when the packet is delivered in a daisy chain manner (transmitter→receiver A→receiver B→receiver C) and the receiver B is assumed to be the mobile host (when HoA is designated as an address of the receiver B), actual delivery becomes transmitter→receiver A→home agent→(encapsulation with an IP header addressed to CoA) →receiver B→receiver C. When the receiver B moves during communication, the receiver B gets new CoA and then registers the CoA in the home agent, so that a series of communications can be performed continuously.

In order to perform a registration procedure of physical movement of the receiver B→connection to new destination network→getting of new CoA→home agent, there is possibility that a time lag of at least several seconds may occur.

During that time, the home agent recognizes that "the receiver B is being connected to the (old) destination network" so that even if the packet is transferred to the old CoA, the receiver B cannot receive the packet. As a result, communication is interrupted because the packet cannot be transferred from the receiver B to the receiver C.

On the other hand, in the third embodiment, by a method of separating a delivery path of a mobile host as a receiver from a delivery path of another host, packet delivery can be prevented from being interrupted due to movement of the mobile host when the packet is being delivered in a daisy chain manner in the explicit multicast system.

Incidentally, in the third embodiment, the home agent intercepts a packet addressed to HoA of a mobile host and analyzes packet-undelivered receivers' addresses written in the packet. When HoA of one or more mobile hosts managed by the home agent are contained, the home agent makes a number of replicas of the packet corresponding to the number of mobile hosts and sends the replicas of the packet to the mobile hosts respectively.

On this occasion, the home agent does not encapsulate the packet with an IP header addressed to CoA of the transfer destination mobile host, but changes the destination address of the IP header in the packet from the HoA of the mobile host to the CoA thereof and transfers the packet to the mobile host. Thus, a field of a payload which can be used by an application can be prevented from being reduced.

Incidentally, in the third embodiment, for transferring a packet to each of packet-undelivered hosts in the packet other than mobile hosts managed by the home agent, the home agent does not search the home agent's unicast routing table concerned with the hosts, but transfers the packet to one of the hosts. Thus, load of the home agent can be reduced.

Configuration of Home Agent in Third Embodiment

Figure 13:
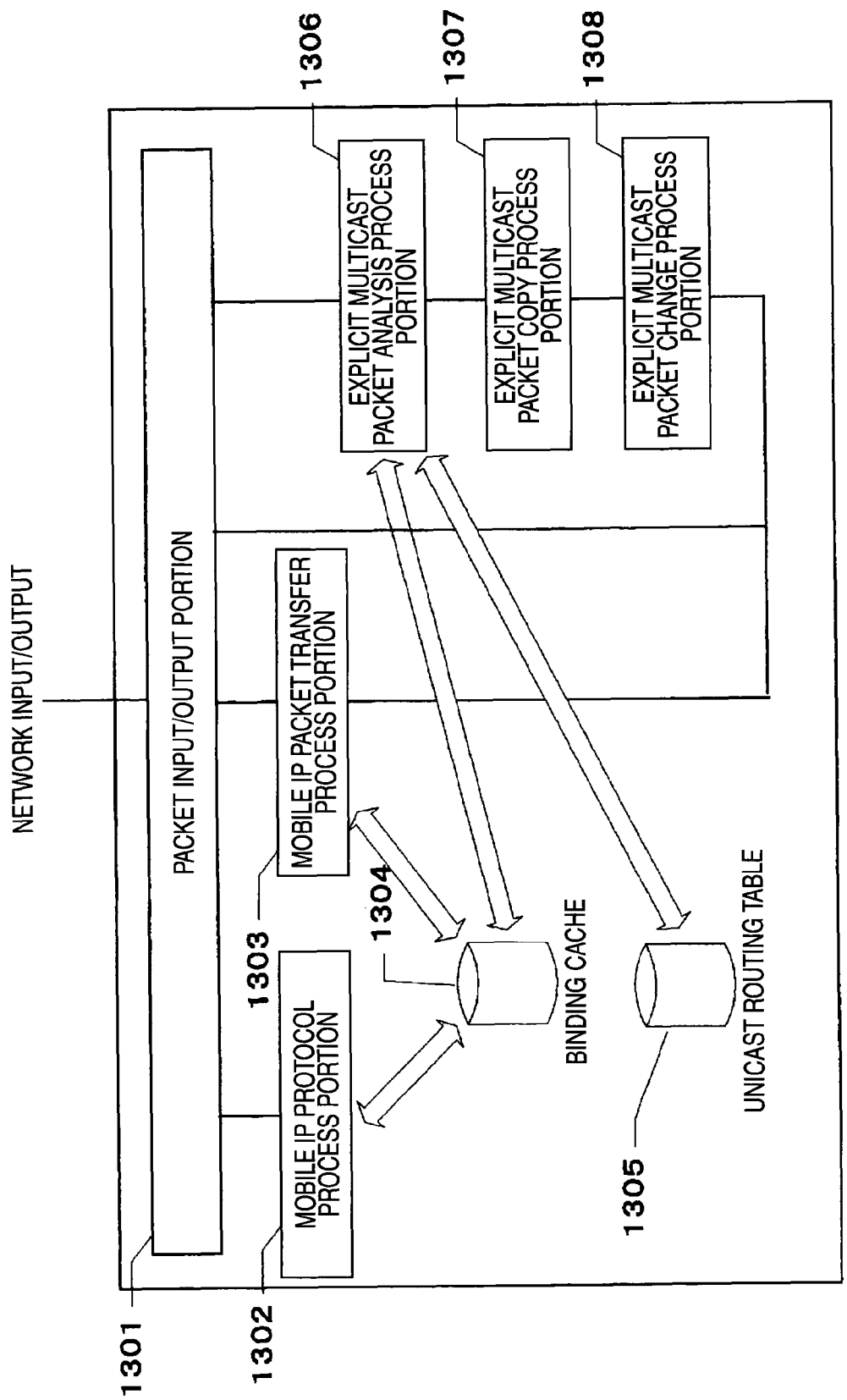
FIG. 13 A functional block diagram in the third embodiment.

A functional configuration concerned with the third embodiment of the present invention will be described below with reference to FIG. 13. A home agent 1300 has a packet input/output (I/O) portion 1301, a Mobile IP protocol process portion 1302, a Mobile IP packet transfer process portion 1303, a Binding cache 1304, a unicast routing table 1305, an explicit multicast packet analysis process portion 1306, an explicit multicast packet copy process portion 1307 and an explicit multicast packet change process portion 1308.

The packet I/O portion 1301 receives a packet from a mobile host or a communication destination host, and transfers information to the respective portions in accordance with the received packet. The Mobile IP protocol process portion 1302 has a function of receiving/transmitting a Binding Update message/Binding Acknowledgement message about movement of a mobile host, so as to register HoA and CoA of the mobile host in the Binding cache 1304. The Mobile IP packet transfer process portion 1303 has a function of encapsulating a packet which is intercepted by the home agent 1300 and addressed to the HoA of the mobile host, with an IP header addressed to the CoA of the mobile host, and transferring the encapsulated packet to the mobile host.

The explicit multicast packet analysis process portion 1306 has a function peculiar to the third invention to analyze a packet-undelivered receiver address list written in the packet in the explicit multicast system as to whether the HoA held in the Binding cache 1304 is contained or not.

The explicit multicast packet analysis process portion 1306 has a function of referring to the unicast routing table 1304 for performing a packet copy process for each address other than the mobile hosts managed by the home agent 1300 in the packet-undelivered receiver list written in the packet in the explicit multicast system.

The explicit multicast packet copy process portion 1307 has a function peculiar to the third invention to copy the packet, if necessary, in accordance with a result of the analysis of the explicit multicast packet analysis process portion 1306.

The explicit multicast packet change process portion 1308 has a function peculiar to the third invention. The explicit multicast packet change process portion 1308 rewrites a destination address of each packet to HoA of a mobile node. Then, the explicit multicast packet change process portion 1308 regards each address other than the designated destination address HoA as a packet-delivered address in the list of receivers' addresses in the packet, encapsulates the packet with an IP header, and transfers the encapsulated packet to the mobile host through the Mobile IP packet transfer process portion 1303.

In addition, the explicit multicast packet change process portion 1308 may change the designated destination address of the packet from the HoA to corresponding CoA, and transfer the packet to the mobile host through the packet I/O portion 1301 without encapsulating the packet with an IP header.

In addition, the explicit multicast packet change process portion 1308 changes the destination address of the packet which will be sent to any receiver other than the mobile host, to an address of the receiver other than the mobile host, and then transmits the packet through the packet I/O portion 1301.

Fourth Embodiment

Figure 11:
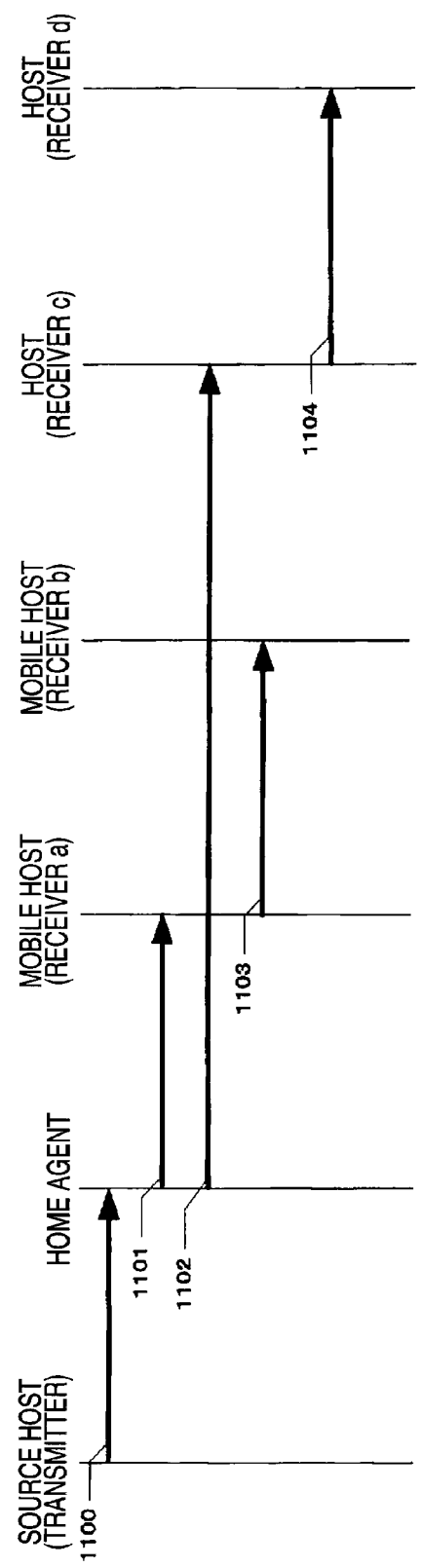
FIG. 11 A communication sequence view in the fourth embodiment.
Figure 12:
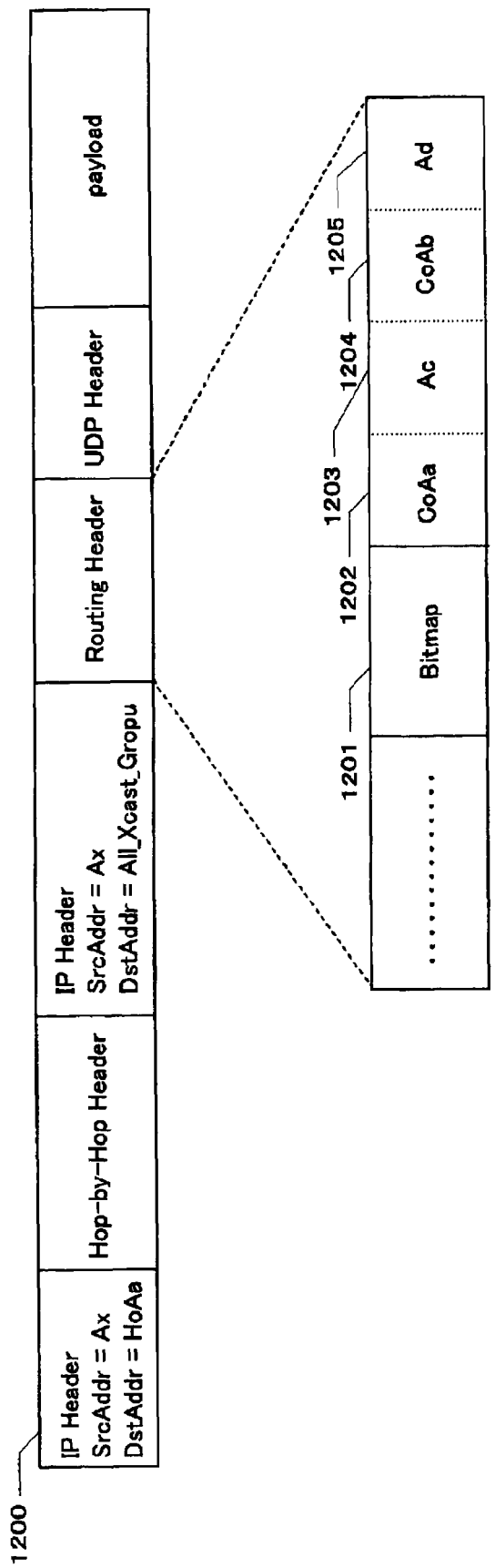
FIG. 12 A packet configuration view concerned with the fourth embodiment.

Description will be made on a processing example in the case where a fourth invention is applied to a home agent according to a fourth embodiment of the present invention. This operation will be described specifically with reference to FIG. 3, FIG. 6, and FIGS. 11 and 12. FIG. 3 is an XCAST packet configuration view. FIG. 6 is a network configuration view. FIG. 11 is a communication sequence view in the case of the fourth embodiment. FIG. 12 is an XCAST packet configuration.

(Source Host→Home Agent)

First, in a network configuration in FIG. 6, a home agent 601 to which the present invention is applied manages a mobile host (receiver a) 602 and a mobile host (receiver b) 603, and intercepts a packet 1100 which is sent from a source host 600 and which is shown in FIG. 3.

Then, the home agent 601 analyzes the aforementioned packet 1100 as to whether any HoA managed by the home agent 601 is contained in packet-undelivered receivers' addresses 302 to 305 or not. On this occasion, although HoAa 302 and HoAb 304 satisfy the aforementioned condition, the packet is copied once because it is found from CoAa and CoAb as CoA corresponding to the HoAa 302 and the HoAb 304 that the mobile host (receiver a) 602 and the mobile host (receiver b) 603 are connected to one and the same destination network.

(Home Agent→Receiver a)

The home agent 601 changes the copied packet from the one shown in FIG. 3 to the one shown in FIG. 12. Specifically, the home agent 601 rewrites the HoAa 302 and the HoAb 304 to CoAa 1203 and CoAb 1204 respectively based on the Binding cache of the home agent 601. The home agent 601 changes each of bits of Bitmap 1201 corresponding to Ac 1203 and Ad 1205 to a value indicating that the packet has been delivered, grants an IP header addressed to the CoAa, and sends a packet 1101 to the mobile host (receiver a) 602.

The home agent 601 searches a home agent's unicast routing table concerned with the packet-undelivered receivers' addresses (303 and 305) except the HoAa 302 and the HoAb 304 in the intercepted packet, so as to get next hop information.

(Home Agent→Receiver c)

When the Ac and the Ad have one and the same next hop as a result of the aforementioned process, the home agent 601 determines that it is not necessary to copy the packet. The home agent 601 changes each of bits of Bitmap 301 corresponding to the HoAa 302 and the HoAb 304 to a value indicating that the packet has been delivered, changes the destination address of the packet to the Ac, and sends a packet 1102 to a delivery interface corresponding to the next hop.

(Receiver a→Receiver b)

Upon reception of the packet 1101, the mobile host (receiver a) 602 changes a bit of the Bitmap 1201 corresponding to the CoAa in the packet to a value indicating that the packet has been delivered, and checks the Bitmap 1201. On this occasion, when there is any packet-undelivered receiver, the mobile host (receiver a) 602 sends a packet 1103 by designating the address CoAb of the mobile host (receiver b) 603 which will be the first receiver, as a destination address of an IP header 1200 of the aforementioned packet.

Upon reception of the packet 1103, the mobile host (receiver b) 603 changes a bit of the Bitmap 1201 corresponding to the CoAb in the packet to a value indicating that the packet has been delivered, and checks the Bitmap 1201. On this occasion, the mobile host (receiver d) 605 does not send a packet any more because the packet has been delivered to all the receivers.

(Receiver c→Receiver d)

Upon reception of the packet 1102, the host (receiver c) 104 changes a bit of the Bitmap 301 corresponding to the Ac in the aforementioned packet to a value indicating that the packet has been delivered, and checks the Bitmap 301. On this occasion, when there is any packet-undelivered receiver, the host (receiver c) 104 sends a packet 1104 by designating the address Ad of the host (receiver d) 605 which will be the first receiver, as the destination address of the IP header 300 of the aforementioned packet.

Upon reception of the packet 1104, the host (receiver d) 605 changes a bit of the Bitmap 301 corresponding to the Ad in the aforementioned packet to a value indicating that the packet has been delivered, and checks the Bitmap 301. On this occasion, the host (receiver d) 605 does not send a packet any more because the packet has been delivered to all the receivers.

As described above, the fourth embodiment is different from the operation example in the background art in that when the home agent analyzes packet-undelivered receivers' addresses written in a packet in an explicit multicast system with a result that HoA of one or more mobile hosts managed by the home agent are contained, the packet is copied so that a number of replicas of the packet corresponding to the number of the mobile hosts are made and sent to the mobile hosts respectively. On this occasion, when a plurality of mobile hosts are connected to one and the same destination network, the packet is copied once for the mobile hosts, and the packet is delivered to one of the mobile hosts.

The home agent regards the HoA of each mobile host managed by the home agent as a packet-delivered address, and successively searches the home agent's unicast routing table in accordance with each residual packet-undelivered receiver's address so as to get next hop information. When the next hops are different with respect to the packet-undelivered receivers' addresses, the home agent copies the packet so as to prepare a number of replicas of the packet corresponding to the number of next hops. The home agent sends the replicas of the packet to delivery interfaces corresponding to the next hops, respectively.

Band consumption and delay in packet delivery can be reduced by the aforementioned operation. By a method of separating a delivery path of a mobile host as a receiver from a delivery path of another host, packet delivery can be prevented from being interrupted due to movement of the mobile host when the packet is being delivered in a daisy chain manner in an explicit multicast system. That is, in FIG. 11, the delivery path is separated into two paths, i.e. a path of mobile host (receiver a)→mobile host (receiver b) and a path of mobile host (receiver c)→mobile host (receiver d).

Incidentally, in the fourth embodiment, the home agent intercepts a packet addressed to HoA of a mobile host, analyzes packet-undelivered receivers' addresses written in the packet, makes replicas of the packet if necessary, and sends the replicas of the packet to mobile hosts respectively.

On this occasion, the home agent does not encapsulate the packet with an IP header addressed to CoA of the transfer destination mobile host, but changes the destination address of the IP header in the packet from the HoA of the mobile host to the CoA thereof and transfers the packet to the mobile host. Thus, a field of a payload which can be used by an application can be prevented from being reduced.

Incidentally, in the fourth embodiment, for transferring a packet to packet-undelivered hosts written in the packet other than the mobile hosts managed by the home agent, the home agent does not search the home agent's unicast routing table concerned with the hosts, but transfers the packet to one of the hosts. Thus, load of the home agent can be reduced.

Configuration of Home Agent in Fourth Embodiment

Figure 15:
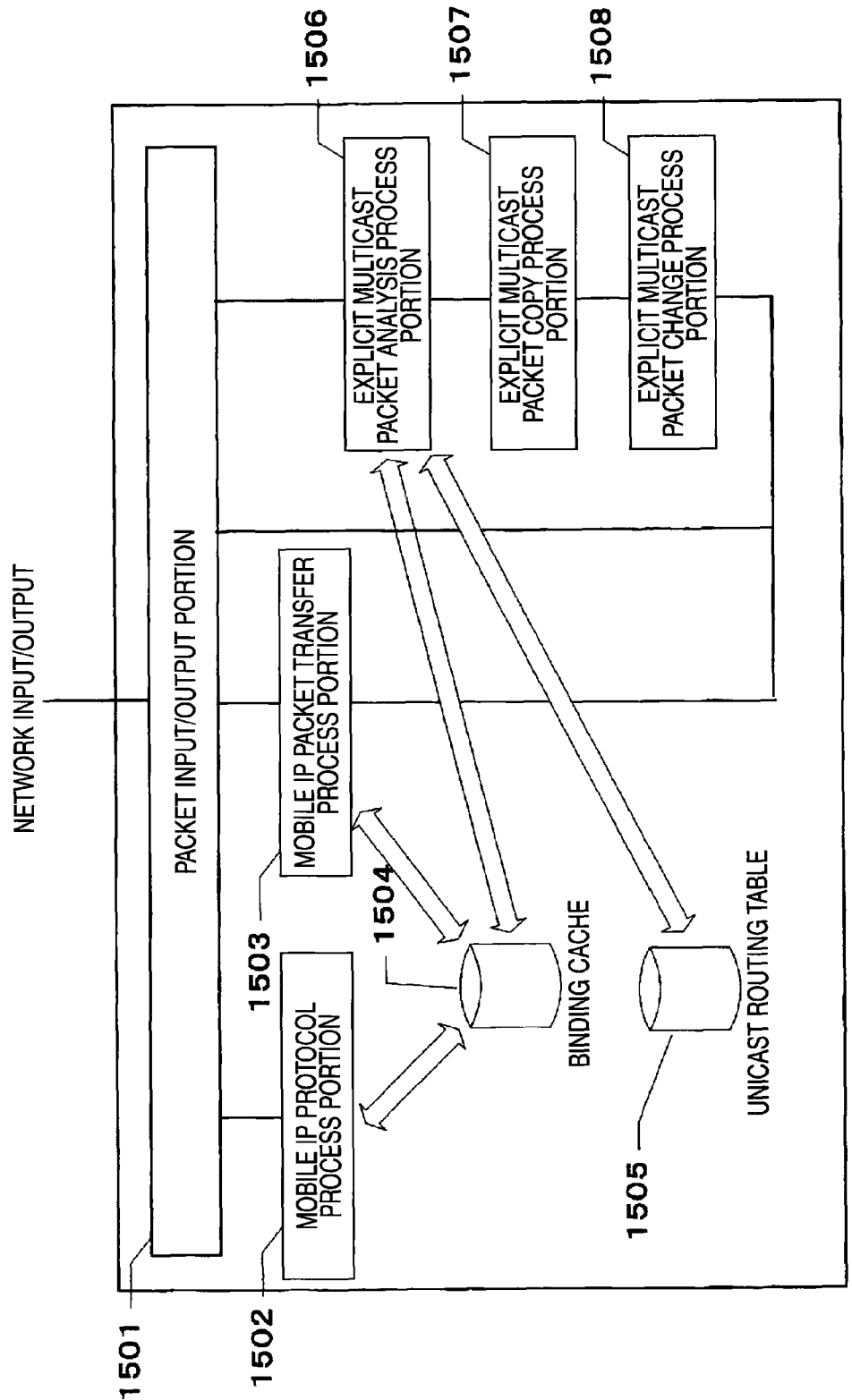
FIG. 15 A functional block diagram in the fourth embodiment.

A functional configuration concerned with the fourth embodiment of the present invention will be described below with reference to FIG. 15. A home agent 1500 has a packet input/output (I/O) portion 1501, a Mobile IP protocol process portion 1502, a Mobile IP packet transfer process portion 1503, a Binding cache 1504, a unicast routing table 1505, an explicit multicast packet analysis process portion 1506, an explicit multicast packet copy process portion 1507 and an explicit multicast packet change process portion 1508.

The packet I/O portion 1501 receives a packet from a mobile host or a communication destination host, and transfers information to the respective portions in accordance with the received packet. The Mobile IP protocol process portion 1502 has a function of receiving/transmitting a Binding Update message/Binding Acknowledgement message about movement of a mobile host, so as to register HoA and CoA of the mobile host in the Binding cache 1504. The Mobile IP packet transfer process portion 1503 has a function of encapsulating a packet which is intercepted by the home agent 1500 and addressed to the HoA of the mobile host, with an IP header addressed to the CoA of the mobile host, and transferring the encapsulated packet to the mobile host.

The explicit multicast packet analysis process portion 1506 has a function peculiar to the fourth invention to analyze a packet-undelivered receiver address list written in the packet in the explicit multicast system as to whether the HoA held in the Binding cache 1504 is contained or not.

The explicit multicast packet analysis process portion 1506 has a function of referring to the unicast routing table 1504 for performing a packet copy process for each address other than the mobile hosts managed by the home agent 1500 in the packet-undelivered receiver list written in the packet in the explicit multicast system.

The explicit multicast packet copy process portion 1507 has a function peculiar to the fourth invention to copy the packet, if necessary, in accordance with a result of the analysis of the explicit multicast packet analysis process portion 1506.

The explicit multicast packet change process portion 1508 has a function peculiar to the fourth invention to rewrite a destination address of each packet to HoA of a mobile node. Then, the explicit multicast packet change process portion 1508 regards each address other than the designated destination address HoA in the list of receivers' addresses in the packet as a packet-delivered address, encapsulates the packet with an IP header, and transfers the encapsulated packet to the mobile host through the Mobile IP packet transfer process portion 1503.

In addition, the explicit multicast packet change process portion 1508 may change the designated destination address of the packet from the HoA to corresponding CoA, and transfer the packet to the mobile host through the packet I/O portion 1501 without encapsulating the packet with an IP header.

In addition, the explicit multicast packet change process portion 1508 changes the destination address of the packet which will be sent to any receiver other than the mobile host, to an address of the receiver other than the mobile host, and then sends the packet through the packet I/O portion 1501.

Although the present invention has been described in detail and with reference to its specific embodiments, it is obvious to those skilled in the art that various changes or modifications can be made without departing from the sprit and scope of the present invention.

The present application is based on a Japanese patent application (Patent Application No. 2005-140243) filed on May 12, 2005, the contents of which will be incorporated herein by reference.

INDUSTRIAL APPLICABILITY

The present invention is effective in reducing consumption of band resources and delay in communication as a whole in a packet relay method in an explicit multicast system. Particularly, the present invention is useful for an explicit multicast type packet relay method in mobile nodes such as portable terminals and a node for managing destination addresses of the mobile nodes, a home agent, etc.

What is claimed is:

1. A packet relay method for relaying an explicit multicast packet from a home agent that manages home and care of addresses of one or more mobile nodes where the one or more mobile nodes are movable among networks, the method comprising:

receiving, at the home agent, an explicit multicast packet that includes a plurality of receivers' addresses written in a list of receivers' addresses, the explicit multicast packet having a home address of one of the one or more mobile nodes managed by the home agent designated as a destination address of the packet;

analyzing, at the home agent, whether or not packet-undelivered addresses written in the list of receivers' addresses in the packet are home addresses of the one or more mobile nodes managed by the home agent; and relaying the packet based on a result of the analysis, wherein relaying the packet based on the result of the analysis further comprises rewriting the home addresses of the one or more mobile nodes in the list of receivers' addresses as corresponding care of addresses of the one or more mobile nodes.

2. The packet relay method according to claim 1, wherein in the relay of relaying the packet based on the result of the analysis further comprises copying the packet is copied to make a number of replicas of the packet corresponding to a number of the home addresses of the one or more mobile nodes managed by the home agent in the list of receivers' addresses.

3. The packet relay method according to claim 2, further comprising:

rewriting, at the home agent, respective destination addresses of the respective replicas of the packet as the home addresses of the one or more mobile nodes managed by the home agent in the list of receivers' addresses respectively;

setting addresses other than the home addresses designated as the respective destination addresses as packet-delivered addresses in respective lists of receivers' addresses in the respective replicas of the packet;

encapsulating the respective replicas of the packet with an IP header addressed to corresponding care of addresses of the one or more mobile nodes designated by the respective destination addresses of the respective replicas of the packet; and transferring the encapsulated replicas of the packet to the one or more mobile nodes.

4. The packet relay method according to claim 2, further comprising:

rewriting, at the home agent, respective destination addresses of the respective replicas of the packet as care of addresses of the one or more mobile nodes managed by the home agent in the list of receivers' addresses respectively;

changing the home addresses of the one or more mobile nodes designated as the respective destination addresses to corresponding care of addresses in a respective list of receivers' addresses in each replica of the packet;

setting addresses other than the address of the one or more mobile nodes designated as the respective destination addresses as packet-delivered addresses in the respective lists of receivers' addresses in the respective replicas of the packet; and transferring the replicas of the packet to the one or more mobile nodes.

5. The packet relay method according to claim 2, further comprising:

setting, at the home agent, sets all home addresses of one or more mobile nodes managed by the home agent as packet-delivered addresses in the receivers' address list in the packet;

searching a home agent's unicast routing table concerned with the packet-undelivered addresses in the receivers' address list to thereby get next hop information;

copying the packet to prepare a number of replicas of the packet corresponding to the number of next hops when the next hops are different with respect to the packet-undelivered addresses; and transmitting the replicas of the packet to delivery interfaces corresponding to the next hops respectively.

6. The packet relay method according to claim 2, further comprising:

setting, at the home agent, all home addresses of one or more mobile nodes managed by the home agent as packet-delivered addresses in the receivers' address list in the packet; and transmitting the packet by designating one of the packet-undelivered addresses in the receivers' address list as a destination address of the packet.

7. The packet relay method according to claim 1, wherein relaying the packet based on the result of the analysis further comprises copying the packet to make a number of replicas of the packet corresponding to a number of destination networks to which mobile nodes corresponding to the packet-undelivered addresses in the list of receivers' addresses in the packet are connected.

8. The packet relay method according to claim 7, further comprising:

rewriting, at the home agent, the destination address of each of the replicas of the packet corresponding to the number of destination networks to which the mobile nodes are connected as a home address of one of mobile nodes connected to each of the destination networks;

changing home addresses of the mobile nodes connected to a same destination network to corresponding care of addresses of the mobile nodes in the list of receivers' addresses in each of the replicas of the packet;

setting addresses other than the addresses of the mobile nodes connected to the same destination network as packet-delivered addresses in the lists of receivers' addresses in each of the replicas of the packet;

encapsulating each of the replicas of the packet with an IP header addressed to the destination address of the mobile node designated by the destination address of the packet; and transferring each of the replicas of the encapsulated packet to the mobile nodes.

9. The packet relay method according to claim 7, further comprising:

rewriting, at the home agent, the destination address of each of the replicas of the packet corresponding to the number of destination networks to which the mobile nodes are connected to a destination address of one of mobile nodes connected to each of the destination networks;

changing home addresses of the mobile nodes connected to the destination network being the same as the mobile nodes designated as the destination address to corresponding destination addresses of the mobile nodes in the list of receivers' addresses in the packet;

setting addresses other than the addresses of the mobile nodes connected to a same destination network as packet-delivered addresses; and transferring the packet to the mobile node.

10. The packet relay method according to claim 7, further comprising:

setting, at the home agent, all home addresses of one or more mobile nodes managed by the home agent as packet-delivered addresses in the receivers' address list in the packet;

searching a home agent's unicast routing table concerned with the packet-undelivered addresses in the receivers' address list to thereby get next hop information;

copying the packet to prepare a number of replicas of the packet corresponding to the number of next hops when the next hops are different with respect to the packet-undelivered addresses; and transmitting the replicas of the packet to delivery interfaces corresponding to the next hops respectively.

11. The packet relay method according to claim 7, further comprising:

setting, at the home agent, all home addresses of one or more mobile nodes managed by the home agent as packet-delivered addresses in the receivers' address list in the packet; and transmitting the packet by designating one of the packet-undelivered addresses in the receiver address list as a destination address of the packet.

12. The packet relay method according to claim 1, further comprising arranging, at the home agent, the list of receivers' addresses to group receivers' addresses of mobile nodes connected to a same destination network side by side in the list of receivers' addresses while including other receivers' addresses in the list of receivers' addresses.

13. The packet relay method according to claim 1, further comprising:

encapsulating, at the home agent, the packet with an IP header addressed to a care of address of the mobile node designated by the destination address of the packet; and transferring the encapsulated packet to the mobile node.

14. The packet relay method according to claim 1, further comprising:

rewriting, at the home agent, the home address of the mobile node designated by the destination address of the packet as a care of address of the mobile node; and transferring the packet to the mobile node.

15. A home agent for managing home and destination addresses of one or more mobile nodes, comprising:

a packet reception portion which receives an explicit multicast packet in which any one of home addresses of mobile nodes managed by the home agent is designated as a destination address of the packet;

a packet analysis portion which analyzes whether or not packet-undelivered addresses written in a list of receivers' addresses in the packet are home addresses of one or more mobile nodes managed by the home agent;

a packet change portion which rewrites the home addresses of the one or more mobile nodes in the list of receivers' addresses as corresponding care of addresses in the list of receivers' addresses based on a result of the analysis; and a packet transfer portion which transfers the packet to the mobile node.

16. The home agent according to claim 15, wherein when the mobile nodes are connected to a same destination network, the packet change portion arranges the list the receivers' addresses to group receivers' addresses of the mobile nodes connected to the same destination network side by side in the list of receivers' addresses while including other receivers' addresses in the list of receivers' addresses.

17. A home agent for managing home and care of addresses of one or more mobile nodes, comprising:
a packet reception portion which receives an explicit multicast packet in which any one of home addresses of mobile nodes managed by the home agent is designated as a destination address of the packet;
a packet analysis portion which analyzes whether or not packet-undelivered addresses written in a list of receivers' addresses in the packet are home address of one or more mobile nodes managed by the home agent;
a packet change portion which rewrites the home addresses of the one or more mobile nodes in the list of receivers' addresses as corresponding care of addresses in the list of receivers' addresses based on the analysis, the packet change portion further copies the packet to make a number of replicas of the packet corresponding to a number of mobile nodes managed by the home agent with packet-undelivered addresses in the list of receivers' addresses, and sets addresses other than the mobile address to be transferred as packet-delivered addresses in the replicas of the packet in the number of mobile nodes on the basis of the result of the analysis; and
a packet transfer portion which transfers an encapsulated packet to the mobile node.

18. The home agent according to claim 17, wherein the packet change portion sets all home addresses of the mobile nodes as packet-delivered addresses in the list of receivers' addresses in the packet, searches a home agent's unicast routing table concerned with packet-undelivered addresses in the list of receivers' addresses to get next hop information, and copies the packet when the next hops are different with respect to the packet-undelivered receivers' addresses; and
wherein the packet transmission portion transmits the replicas of the packet to delivery interfaces corresponding to the next hops respectively.

19. The home agent according to claim 18, wherein the packet change portion sets all the home addresses of the mobile nodes as packet-delivered addresses in the list of receivers' addresses in the received packet, and designates one of packet-undelivered addresses in the list of receivers' addresses in the packet as the destination address of the packet; and
wherein the packet transmission portion transmits the packet to the node of the address.

20. A home agent for managing home and care of addresses of one or more mobile nodes, comprising:
a packet reception portion which receives an explicit multicast packet in which any one of home addresses of mobile nodes managed by the home agent is designated as a destination address of the packet;
a packet analysis portion which analyzes whether or not packet-undelivered addresses written in a list of receivers' addresses in the packet are home address addresses of one or more mobile nodes managed by the home agent;
a packet change portion which rewrites the home addresses of the one or more mobile nodes in the list of receivers' addresses as corresponding care of addresses in the list of receivers' addresses based on the analysis, the packet change portion further copies the packet to make a number of replicas of the packet corresponding to a number of destination networks to which the mobile nodes are connected on the basis of the result of the analysis, rewrites the home addresses of the mobile nodes connected to a same destination network in the list of receivers' addresses in the replicas of the packet as corresponding care of addresses, and sets addresses other than the addresses of the mobile nodes connected to the same destination network as packet-delivered addresses in the list of receivers' addresses; and
wherein the packet transfer portion transfers the replicas of the packet to one of the mobile nodes connected to the same destination network respectively.

21. The home agent according to claim 20, wherein the packet change portion sets all home addresses of the mobile nodes as packet-delivered addresses in the list of receivers' addresses in the packet, searches a home agent's unicast routing table concerned with packet-undelivered addresses in the list of receivers' addresses to get next hop information, and copies the packet when the next hops are different with respect to the packet-undelivered receivers' addresses; and
wherein the packet transmission portion transmits the replicas of the packet to delivery interfaces corresponding to the next hops respectively.

22. The home agent according to claim 20, wherein the packet change portion sets all the home addresses of the mobile nodes as packet-delivered addresses in the list of receivers' addresses in the received packet, and designates one of packet-undelivered addresses in the list of receivers' addresses in the packet as the destination address of the packet; and
wherein the packet transmission portion transmits the packet to the node of the address.

* * * * *

UNITED STATES PATENT AND TRADEMARK OFFICE
CERTIFICATE OF CORRECTION

| | | |
|---|---|---|
| PATENT NO. | : 7,948,927 B2 | |
| APPLICATION NO. | : 11/913085 | |
| DATED | : May 24, 2011 | |
| INVENTOR(S) | : Takahiro Yoneda | |

It is certified that error appears in the above-identified patent and that said Letters Patent is hereby corrected as shown below:

In column 9, line 21, please delete "(receiver 12)" and instead insert --(receiver b)--.

In column 10, line 4, please delete "505" and instead insert --105--.

In column 17, line 62, please delete "605" and instead insert --603--.

In column 17, line 67, please delete "104" and instead insert --604--.

In column 20, line 33, please delete "in the relay of".

In column 20, line 34, please delete "is copied".

In column 21, line 10, please delete "sets".

In column 23, line 46, please delete "according to claim 18" and instead insert --according to claim 17--.

Signed and Sealed this
First Day of November, 2011

David J. Kappos
*Director of the United States Patent and Trademark Office*